(12) United States Patent
Fuwa et al.

(10) Patent No.: US 8,050,850 B2
(45) Date of Patent: Nov. 1, 2011

(54) CONTROL APPARATUS AND CONTROL METHOD FOR INTERNAL COMBUSTION ENGINE

(75) Inventors: Naohide Fuwa, Nishikamo-gun (JP); Tokiji Ito, Toyota (JP); Seiko Tamada, Toyota (JP); Hiroyuki Kanemoto, Fujinomiya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 232 days.

(21) Appl. No.: 12/601,695

(22) PCT Filed: May 26, 2008

(86) PCT No.: PCT/IB2008/001320
§ 371 (c)(1),
(2), (4) Date: Nov. 24, 2009

(87) PCT Pub. No.: WO2008/142559
PCT Pub. Date: Nov. 27, 2008

(65) Prior Publication Data
US 2010/0170459 A1     Jul. 8, 2010

(30) Foreign Application Priority Data
May 24, 2007   (JP) .................... 2007-138202

(51) Int. Cl.
*F01L 9/04*       (2006.01)
*F02D 41/22*      (2006.01)

(52) U.S. Cl. ............. 701/107; 701/110; 123/90.11; 123/90.15; 123/339.15

(58) Field of Classification Search ............ 123/90.11, 123/90.15, 345–348, 399, 339.15, 397, 198 D; 701/107, 110
See application file for complete search history.

(56) References Cited

U.S. PATENT DOCUMENTS

| | | | |
|---|---|---|---|
| 7,917,310 B2 * | 3/2011 | Pearce et al. | 702/38 |
| 2002/0157639 A1 | 10/2002 | Kidokoro et al. | |
| 2004/0035391 A1 | 2/2004 | Fuwa | |
| 2004/0187815 A1 | 9/2004 | Hiraku | |
| 2005/0039710 A1 | 2/2005 | Hashizume et al. | |
| 2006/0130787 A1 | 6/2006 | Arai et al. | |
| 2011/0139119 A1 * | 6/2011 | Kobayashi | 123/406.29 |

FOREIGN PATENT DOCUMENTS

| | | | |
|---|---|---|---|
| EP | 0 581 151 | | 2/1994 |
| EP | 1 394 367 | | 3/2004 |
| EP | 1 669 560 | | 6/2006 |
| JP | 60-150409 | * | 8/1985 |

(Continued)

*Primary Examiner* — Hai Huynh
(74) *Attorney, Agent, or Firm* — Oblon, Spivak, McClelland, Maier & Neustadt, L.L.P.

(57) ABSTRACT

An internal combustion engine includes a valve timing change mechanism that changes the phase of an intake cam, and a lift amount change mechanism that changes lift amount by causing displacement of a control shaft. An electronic control unit performs a coordinated control in which the lift amount change mechanism is operated such that the position of the control shaft that is detected by a position detection sensor becomes the target position, and the valve timing change mechanism is operated according to a control state of the lift amount change mechanism. When a discrepancy between the actual position of the control shaft and the detected position thereof is estimated to be large, coordinated control is forbidden and the valve timing change mechanism is operated based on engine load.

12 Claims, 14 Drawing Sheets

FOREIGN PATENT DOCUMENTS

| | | |
|---|---|---|
| JP | 4 91320 | 3/1992 |
| JP | 8 144794 | 6/1996 |
| JP | 8-276800 | 10/1996 |
| JP | 11 229914 | 8/1999 |
| JP | 2001 263015 | 9/2001 |
| JP | 2003 83149 | 3/2003 |
| JP | 2004 285855 | 10/2004 |
| JP | 2004 293454 | 10/2004 |
| JP | 2004 324458 | 11/2004 |
| JP | 2005 23874 | 1/2005 |
| JP | 2005 282480 | 10/2005 |
| JP | 2007-58775 | 3/2007 |
| JP | 2007 182864 | 7/2007 |

* cited by examiner

FIG. 7

| S1 | S2 | POSITION COUNT VALUE |
|---|---|---|
| H | ↑ | +1 |
| H | ↓ | −1 |
| L | ↑ | −1 |
| L | ↓ | +1 |
| ↑ | H | −1 |
| ↓ | H | +1 |
| ↑ | L | +1 |
| ↓ | L | −1 |

↑ ···RISING EDGE

↓ ···FALLING EDGE

CONTROL APPARATUS AND CONTROL METHOD FOR INTERNAL COMBUSTION ENGINE

BACKGROUND OF THE INVENTION

1. Field of the Invention

The present invention relates to a control apparatus for an internal combustion engine that has a variable valve mechanism that varies valve characteristics of an air intake valve and particularly relates to a control apparatus and control method for an internal combustion engine having a lift amount change mechanism and a valve timing change mechanism as variable valve mechanisms.

2. Description of the Related Art

An internal combustion engine equipped with a variable valve mechanism that changes valve characteristics of an air intake valve according to engine operational state is being put into practical use. As this type of variable valve mechanism, a valve timing change mechanism is widely known that changes valve timing of an air intake valve that is opened and closed by a cam shaft by changing a rotation phase of the cam shaft relative to a crank shaft.

In recent years, a lift amount change mechanism has been proposed (Japanese Patent Application Publication No. 2001-263015 (JP-A-2001-263015)) that is made capable of continuous change of a maximum lift value and lift time by continuous change of the lift amount of the air intake valve. In this lift amount change mechanism, the lift amount becomes maximum when a movable part becomes positioned at a movable limit position at one side within a specified movable range. Then, by changing a position of the movable part in this movable range, the lift amount of the air intake valve is varied. The control apparatus of an internal combustion engine having this type of lift amount change mechanism detects the present lift amount based on an accumulated movement of the movable part from a base position that is set based on the movable limit position where the lift amount becomes largest.

The internal combustion engine having this type of lift amount change mechanism and the abovementioned valve timing change mechanism changes valve timing according to lift amount of the air intake valve set by the lift amount change mechanism (i.e., performs coordinated control of the lift amount change mechanism and the valve timing change mechanism). By this means, the valve timing and the lift amount of the air intake valve can be finely controlled according to the engine operational state, and improvement of output, fuel consumption, and exhaust properties is possible.

However, the control apparatus of an internal combustion engine having the above type of lift amount change mechanism sometimes becomes unable to recognize the lift amount when a sudden blackout (i.e. a so-called instantaneous interruption) of the electrical power supply occurs due to failed connection of the electrical power line for supplying electrical power to the control apparatus and the like and the accumulated movement of the movable part recorded in memory disappears. Moreover, when the displacement amount of the movable part has changed for some reason during engine stoppage during which electric power is not supplied to the control apparatus and displacement amount of the movable part is not monitored, a discrepancy arises between the lift amount understood by the control apparatus and the actual lift amount.

When a discrepancy arises between the lift amount understood by the control apparatus and the actual lift amount in this manner, and the control apparatus therefore becomes unable to accurately understand the actual lift amount, valve timing set based on the lift amount understood by the control apparatus becomes unsuitable for the engine operational state. This results in instability of the engine operational state, and there is concern that this may cause the occurrence of misfiring, knocking, and the like in some cases.

Specifically, when the valve timing of the air intake valve has been shifted to the advance side in a state where the lift amount of the air intake valve is extremely large as indicated in FIG. 14A, since air intake valve open time IVO becomes early, valve overlap becomes excessively great, and the internal EGR amount increases. This results in an insufficient supply of oxygen for combustion, combustion instability, and a greater risk of misfiring. Moreover, when the valve timing of the air intake valve is shifted to the delay side in a state where the lift amount of the air intake valve is extremely small as indicated in FIG. 14B, the valve open time IVO of the air intake valve is at or after the top dead center, and the valve close time IVC is in the vicinity of the bottom dead center. As a result, negative pressure in the combustion chamber at the valve open time of the air intake valve increases, the flow speed of air introduced to the combustion chamber increases at this time, and the air intake valve is closed and compression is started in the vicinity of the bottom dead center, which result in increase of temperature and pressure within the combustion chamber, and a greater risk of knocking.

SUMMARY OF THE INVENTION

The present invention provides a control apparatus and control method for an internal combustion engine that are capable of suppressing the occurrence of misfiring and knocking even when accurate understanding of the lift amount of the air intake valve by the control apparatus becomes impossible.

A first aspect of the present invention relates to a control apparatus for an internal combustion engine having: a valve timing change mechanism for changing valve timing of an air intake valve; a lift amount change mechanism for changing maximum lift value and lift time of the air intake valve through displacement of a movable part; position detection means for setting a base position based on a movable limit position where the maximum lift value and the lift time become largest, and for detecting a position of the movable part based on accumulated movement of the movable part from the base position; and control means for performing coordinated control by setting a target position of the movable part based on a requested intake air amount, moving the movable part such that the detected position of the movable part becomes the target position to operate the lift amount change mechanism, and operating the valve timing change mechanism according to a control state of the lift amount change mechanism. The above mentioned control apparatus further includes abnormality estimation means for estimating whether a discrepancy between the position of the movable part detected by the detection means and actual position of the movable part is large. The control means, when the discrepancy is estimated to be large by the abnormality estimation means (during the time period when the discrepancy is estimated to be large), forbids the coordinated control and operates the valve timing change mechanism based on engine load.

When the engine load is small, i.e. when the amount of air introduced into the combustion chamber during the air intake stroke is small, due to low oxygen within the combustion chamber, combustion becomes unstable, and misfiring readily occurs. However, when the engine load is large, i.e. when the amount of air introduced into the combustion chamber during the air intake stroke is large, knocking readily occurs since temperature and pressure within the combustion chamber readily rise during the compression stroke. Thus, in the above first aspect of the invention, when discrepancy between the actual position of the movable part and the position of the movable part detected by the detection means is estimated to be large, (i.e. when the controller estimates that discrepancy between the actual lift amount and the maximum lift value and lift time (referred to hereinafter simply as "lift amount") of the air intake valve understood by the control apparatus is large), coordinated control is forbidden, and the valve timing change mechanism is operated based on the engine load. For this reason, setting of the valve timing based on an inaccurate control state of the lift amount change mechanism is avoided, and it is possible to change the valve timing such that occurrence of misfiring is suppressed when the engine load is small, and occurrence of knocking is suppressed when the engine load is large. As a result, even when the lift amount of the air intake valve cannot be accurately understood by the control apparatus, the occurrence of misfiring and knocking can be suppressed.

When the valve timing of the air intake valve is shifted to the advance side in a state where the lift amount of the air intake valve is extremely large, valve overlap becomes excessive, oxygen supplied to combustion becomes insufficient, combustion becomes unstable, and there is a tendency for misfiring to readily occur. However when the valve timing of the air intake valve is shifted to the delay side in a state where lift amount of the air intake valve is extremely small, the valve open time of the air intake valve is at or after the top dead center, the valve close time is in the vicinity of the bottom dead center, temperature and pressure in the combustion chamber are prone to increase, and knocking easily occurs.

Thus, if the discrepancy between the actual position of the movable part and the position of the movable part detected by the detection means is estimated to be large by the abnormality estimation means, the valve timing change mechanism may be operated such that the valve timing of the air intake valve is shifted more to the delay side as the engine load is lower and such that the valve timing of the air intake valve is shifted more to the advance side as engine load is higher.

According to such a configuration, when the engine load is small (i.e. when misfiring readily occurs although knocking tends not to occur), the valve timing of the air intake valve is set at the delay side, and even under conditions where the lift amount of the air intake valve cannot be accurately known, it is possible to avoid the valve characteristics of the air intake valve being set to valve characteristics that may cause misfiring to readily occur, and therefore the occurrence of misfiring can be suitably suppressed. Moreover, when engine load is high (i.e., when knocking readily occurs although misfiring tends not to occur), the valve timing of the air intake valve is shifted to the advance side, and even in a state where the lift amount of the air intake valve cannot be accurately known, it is possible to avoid the valve characteristics of the air intake valve being set to valve characteristics that may cause knocking to readily occur, and therefore the occurrence of knocking can be suitably suppressed.

The above control apparatus may further include learning means that performs a maximum position learning to corrects the accumulated movement by, while adjusting intake air amount using a throttle valve of the air intake path, moving the movable part such that the maximum lift value and lift time increase and learning the position of stoppage of the movable part as the movable limit position. This learning means may execute the above maximum position learning when the above discrepancy is estimated to be large by the abnormality estimation means.

With this configuration, by performing of the maximum position learning, it is possible to eliminate the discrepancy between the actual lift amount and the lift amount understood by the control apparatus. Moreover, since the maximum position learning is performed by operating the movable part such that the lift amount becomes great while regulating the inlet air amount by the throttle valve, the inlet air amount can be suppressed from becoming excessively large by throttling the throttle valve, and the maximum position learning can be executed even during engine operation.

Moreover, when the air intake amount is regulated by the throttle valve in the above manner, the engine output can be changed by changing the degree of opening of the throttle valve, even during execution of the maximum position learning. When the degree of opening of the throttle valve is changed in this manner, the probabilities of occurrence of misfiring and knocking change, respectively, due to a change of the engine load. Thus, when a configuration is adopted in which the maximum position learning is executed in this manner, due to adoption also of a configuration in which the valve timing is changed based on the engine load in the above manner, the valve timing is changed according to the possibilities of occurrence of misfiring and knocking that accompany change of the engine load, and more suitable control of the occurrence of misfiring and knocking becomes possible.

The control means may change the maximum lift value and the lift time of the above air intake valve by moving the above movable part within a certain control range set within a range that is narrower than the movable range of the movable part and within the movable range of the movable part.

When change of the lift amount of the air intake valve is attempted by operating the movable part over the entire movable range determined by the movable limit position where the lift amount of the air intake valve becomes largest (referred to hereinafter as the Hi limit) and the movable limit position where the lift amount of the air intake valve becomes smallest (referred to hereinafter as the Lo limit), a shock is caused every time movement of the movable part is stopped at the Lo limit and the Hi limit as the lift amount is changed, and thus there is concern that this may cause a lowering of durability of the lift amount change mechanism. When this point of concern is addressed by changing the lift amount by moving the movable part in the specified control range that is set to a range that is narrower than the movable range restricted by the Lo limit and the Hi limit as described above, it becomes possible to avoid the occurrence of a shock that occurs due to the stoppage of movement of the movable part by the Lo limit and the Hi limit when the lift amount is changed, and thus improvement of durability of the lift amount change mechanism is possible.

When the load is extremely low such as when idling, combustion becomes unstable and misfiring readily occurs. For this reason, when the above discrepancy is estimated to be large by the above abnormality estimation means, the idle rotation speed may be raised above the idle rotation speed at the time of normal operation. By this means, it is possible to stabilize combustion and suitably suppress the occurrence of misfiring.

Moreover, when executing the maximum position learning in the above manner, because the movable part is operated up to the Hi limit where the lift amount of the air intake valve becomes largest, valve overlap becomes excessively large and misfiring readily occurs. Thus, during execution of the maximum position learning, the idle rotation speed is preferably raised.

A second aspect of the present invention relates to a control apparatus for an internal combustion engine that includes: a valve timing change mechanism for changing a valve timing of an air intake valve; a lift amount change mechanism for changing a maximum lift value and lift time of the air intake valve through displacement of a movable part; position detection means for setting a base position based on a movable limit position where the maximum lift value and lift time become largest and for detecting the position of the movable part based on the accumulated movement of the movable part from the base position; and control means for performing coordinated control in which a target position of the movable part is set based on a requested intake air amount, the movable part is moved such that the detected position of the movable part becomes the target position to operate the lift amount change mechanism, and the valve timing change mechanism is operated according to a control state of the lift amount change mechanism. The control apparatus includes abnormality estimation means for estimating whether the detected position of the movable part is different from a position of the movable part to be detected, wherein, during a time period when it is estimated that the detected position of the movable part is different from the position of the movable part to be detected, the control means forbids the coordinated control and operates the valve timing change mechanism based on engine load.

A third aspect of the present invention relates to a control apparatus for an internal combustion engine including: a valve timing change mechanism that changes a valve timing of an air intake valve; a lift amount change mechanism that changes a maximum lift value and lift time of the air intake valve through displacement of a movable part; a position detector that detects a position of the movable part; a controller that executes coordinated control in which a target position of the movable part is set based on a requested intake air amount, the movable part is moved such that the position of the movable part becomes a target position of the movable part to operate the lift amount change mechanism and the valve timing change mechanism is operated according to a control state of the lift amount change mechanism; and an estimation part that estimates whether discrepancy between the detected position of the movable part and an actual position of the movable part is large. The controller forbids the coordinated control when the discrepancy is estimated between the detected position of the movable part and an actual position of the movable part is large.

A fourth aspect of the present invention relates to a control apparatus for an internal combustion engine including: a valve timing change mechanism that changes a valve timing of an air intake valve; a lift amount change mechanism that changes a maximum lift value and lift time of the air intake valve through displacement of a movable part; a position detector that detects a position of the movable part; a controller that executes coordinated control in which a target position of the movable part is set based on a requested intake air amount, the movable part is moved such that the position of the movable part becomes a target position of the movable part to operate the lift amount change mechanism and the valve timing change mechanism is operated according to a control state of the lift amount change mechanism; and an estimation part that estimates whether the detected position of the movable part is different from a position of the movable part to be detected. The controller forbids the coordinated control during a time period when it is estimated that the detected position of the movable part is different from the position of the movable part to be detected.

A fifth aspect of the present invention relates to a control method for an internal combustion engine having a valve timing change mechanism for changing a valve timing of an air intake valve and a lift amount change mechanism for changing a maximum lift value and lift time of the air intake valve through displacement of a movable part. The control method includes the steps of: detecting a position of the movable part; estimating whether a discrepancy exists between the detected position of the movable part and an actual position of the movable part; when the displacement is estimated to exist, forbidding cooperative control in which the movable part is moved such that the position of the movable part becomes a target position to operate the lift amount change mechanism, and the valve timing change mechanism is operated according to a control state of the lift amount change mechanism; and operating the valve timing change mechanism based on engine load during a time period when the cooperative control is forbidden.

A sixth aspect of the present invention relates to a control method for an internal combustion engine having a lift change mechanism for changing a maximum lift value and lift time of an air intake valve through displacement of a movable part and having an operational apparatus for causing movement of the movable part. The control method includes the steps of: detecting a position of the movable part; estimating whether the detected position of the movable part is different from a position of the movable part to be detected, forbidding coordinated control in which in which the movable part is moved such that the position of the movable part becomes a target position to operate the lift amount change mechanism, the valve timing change mechanism is operated according to a control state of the lift amount change mechanism, when it is estimated that the detected position of the movable part is different from the position of the movable part to be detected; and operating the valve timing change mechanism based on engine load during a time period when the cooperative control is forbidden.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 7 is a table showing the relationship between an increase or decrease in the position count value and the output signal of the position sensor according to the same embodiment.

DETAILED DESCRIPTION OF EMBODIMENTS

Figure 1:
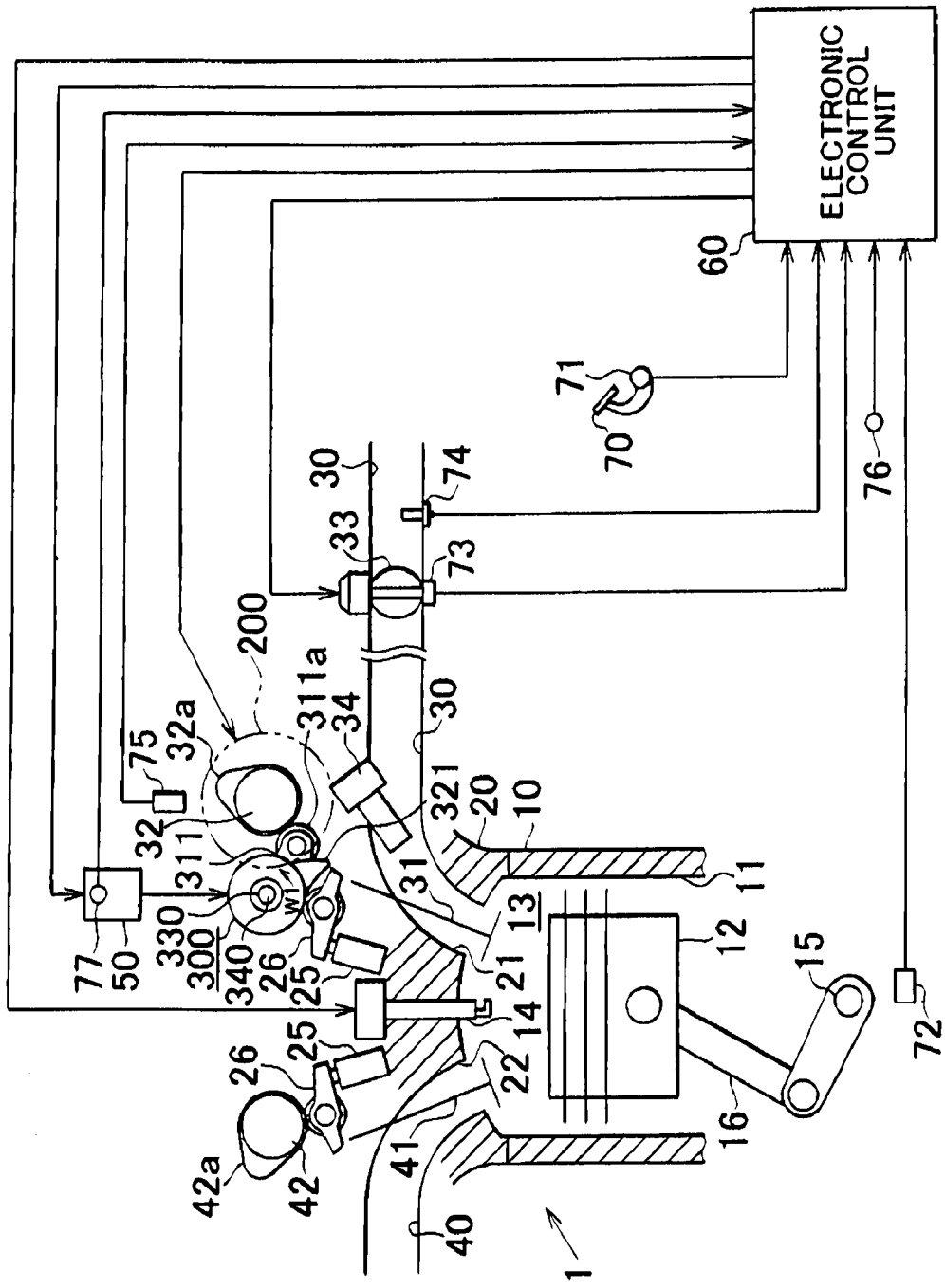
FIG. 1 is a schematic drawing showing abbreviated structure of the internal combustion engine according to a specific embodiment of the present invention.

A specific embodiment of a control apparatus of an internal combustion engine according to this invention is explained below while referring to FIGS. 1 to 14B. FIG. 1 is a schematic drawing showing an abbreviated structure of the internal combustion engine utilizing the control apparatus.

This internal combustion engine 1, as shown in FIG. 1, has a structure that combines a cylinder block 10 and a cylinder head 20. Within a cylinder 11 formed in the cylinder block 10, a piston 12 is contained in a manner such that sliding motion is possible. This piston 12 is connected to a crankshaft 15 by a connecting rod 16. The cylinder head 20 is assembled with, and attached to, the upper part of the cylinder block 10. A combustion chamber 13 is defined by the inner peripheral face of the cylinder 11, a lower surface of the cylinder head 20 and the upper face of the piston 12.

In the cylinder head 20, a spark plug 14 projecting into the combustion chamber 13 is provided, and an air intake port 21 and an exhaust port 22 communicating with the combustion chamber 13 are formed. The air intake port 21 is connected to an air intake manifold (not shown in the drawings) to form part of an air intake path 30. Additionally, the exhaust port 22 is connected to an exhaust manifold (not shown in the drawings) to form part of an exhaust path 40. A throttle valve 33 for adjustment of the amount of air introduced to the combustion chamber 13 and a fuel injection valve 34 for injecting fuel toward the combustion chamber 13 are provided in the air intake path 30.

An air intake valve 31 that connects and disconnects the air intake path 30 and the combustion chamber 13 and an exhaust valve 41 that connects and disconnects the exhaust path 40 and the combustion chamber 13 are provided in the cylinder head 20 as shown in FIG. 1. The valve 31 and the valve 41 are each urged by urging force of a respective valve spring (not shown in the drawings) in the direction of valve closing.

Additionally, within the interior of the cylinder head 20, lash adjusters 25 are provided corresponding to the valve 31 and the valve 41, respectively, and a rocker arm 26 is provided spanning the gap between the lash adjuster 25 and the valve 31 and the valve 41. As shown in FIG. 1, the rocker arm 26 is supported at one tip thereof by the lash adjuster 25, and the other tip contacts the base tip part of the valve 31 and valve 41.

Furthermore, an exhaust cam shaft 42 operating the valve 41 and an air intake cam shaft 32 operating the valve 31 are rotatably supported by the cylinder head 20. The air intake cam shaft 32 and the exhaust cam shaft 42 are each connected to the crank shaft 15 by a timing chain (not shown in the drawings) such that each shaft rotates two times per one rotation of the crank shaft 15. Additionally, the air intake cam shaft 32 is provided with a valve timing change mechanism 200 for changing valve timing of the air intake valve 31 by changing a relative rotational phase of the air intake cam shaft 32 relative to the crank shaft 15.

An air intake cam 32a is formed in the air intake cam shaft 32, and an exhaust cam 42a is formed in the exhaust cam shaft 42. The outer peripheral face of the exhaust cam 42a contacts the rocker arm 26 that is in contact with the exhaust valve 41. In this way, when the exhaust cam shaft 42 rotates during engine operation, due to operation of the exhaust cam 42a, the rocker arm 26 oscillates with the part supported by the lash adjuster 25 acting as a fulcrum point. This results in the exhaust valve 41 being lifted by the rocker arm 26 in the direction of valve opening.

However, a lift amount change mechanism 300 is provided between the air intake cam 32a and the rocker arm 26 that is in contact with the air intake valve 31. This lift amount change mechanism 300 has an input arm 311 and an output arm 321. The input arm 311 and the output arm 321 are supported so as to be able to oscillate about a support pipe 330 fixed to the cylinder head 20. The rocker arm 26 is urged toward the output arm 321 side by urging force of the valve spring and is made to contact the outer peripheral face of the output arm 321. In this way, the lift amount change mechanism 300 is urged in the counterclockwise direction W1 as shown in FIG. 1, and a roller 311a, provided at the tip of the input arm 311, is pressed against the outer peripheral face of the air intake cam 32a. Therefore, when the air intake cam 32a rotates during engine operation, due to operation of the air intake cam 32a, the lift amount change mechanism 300 undergoes oscillation about the support pipe 330. Then, due to operation of the output arm 321, the rocker arm 26 oscillates with the part supported by the lash adjuster 25 acting as a fulcrum point. This results in the air intake valve 31 being lifted by the rocker arm 26 in the direction of valve opening.

Figure 2:
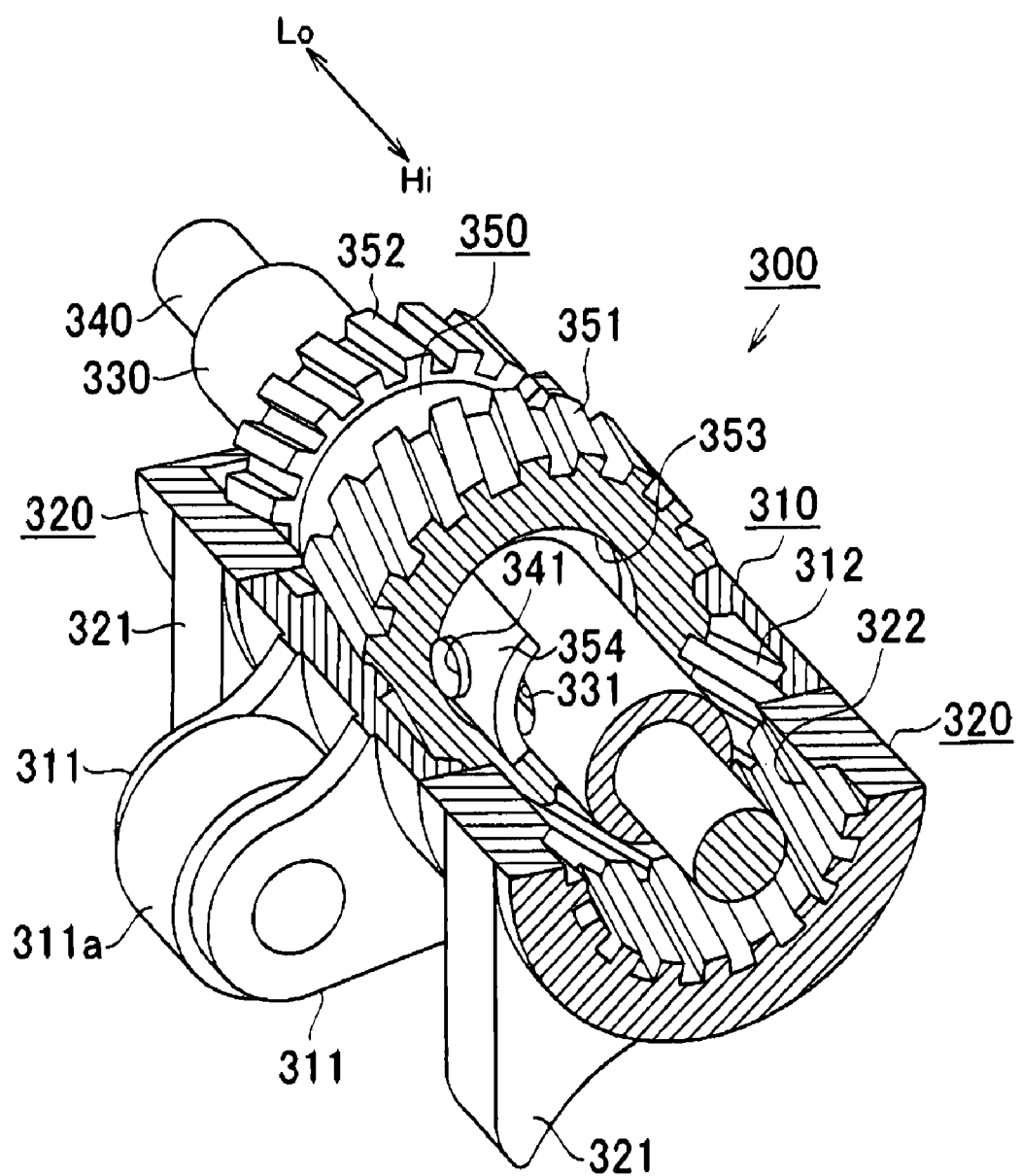
FIG. 2 is a cutaway perspective view of a lift amount change mechanism according to the same embodiment.

Structure of the lift amount change mechanism 300 will be explained in detail next while referring to FIG. 2. FIG. 2 is a cutaway perspective view showing the internal structure of the lift amount change mechanism 300. Within the support pipe 330 fixed to the cylinder head 20, as shown in FIG. 2, a control shaft 340 is inserted so as to be able to move in the axial direction. Also, a cylindrical slider 350 is fitted onto the outside of the support pipe 330 so as to be able to move in the axial direction.

On the interior wall of the cylindrical slider 350 is formed a groove 353 that extends along the circumferential direction, and a bushing 354 engages with this groove 353. An elongated hole 331 is formed in a tube wall of the support pipe 330 and extends in the axial direction thereof. Between the slider 350 and the control shaft 340, a locking pin 341 is provided for connecting together the slider 350 and the control shaft 340 through the elongated hole 331. One tip of the locking pin 341 is inserted into a concave part (not shown in drawings) formed in the control shaft 340, and the other tip of the locking pin 341 is inserted into a through hole formed in the bushing 354. By this means, the slider 350 oscillates freely in the circumferential direction thereof, centered on the support pipe 330 and the control shaft 340, and is able to move in the axial direction thereof in response to axial direction displacement of the control shaft 340.

In the outer peripheral face of the cylinder 350, helical splines 351 are formed at the central part, and helical splines 352 are formed on both sides of the helical splines 351 such that tooth ridges are tilted oppositely.

As shown in FIG. 2, a pair of output parts 320 are fitted onto the outside of the slider 350 and are positioned so as to sandwich an input part 310. Helical splines 312 are formed in the inner peripheral face of the input part 310, and the helical splines 312 mesh with the helical splines 351 of the slider 350. A pair of input arms 311 are formed in the outer peripheral face of the input part 310 and project in the radial direction of the control shaft 340. A roller 311a is rotatably supported between the pair of input arms 311.

Helical splines 322 are formed in the inner peripheral faces of the pair of the output parts 320, and each helical spline 322 meshes with a respective helical spline 352 of the slider 350. A respective output arm 321 projecting in the radial direction of the control shaft 340 is formed in the outer peripheral face of each of the output parts 320.

Using this type of lift amount change mechanism 300, the slider 350 is displaced in the axial direction in response to a displacement of the control shaft 340 along the axial direction thereof. The helical splines 351 formed in the outer peripheral face of the slider 350 mesh with the helical splines 312 formed in the inner peripheral face of the input part 310, and the helical splines 352 formed in the outer peripheral face of the slider 350 mesh with the helical splines 322 formed in the inner peripheral face of the output part 320. Thus, when the slider 350 is displaced in the axial direction thereof, the input part 310 and the output part 320 rotate in mutually opposite directions. As a result, relative phase differential between the input arm 311 and the output arm 321 is changed, and a maximum lift value and a lift time (abbreviated hereinafter as "lift amount") of the air intake valve 31 are changed. Specifically, when the control shaft 340 is displaced in the Hi direction indicated by the arrow in FIG. 2, the slider 350 moves in the Hi direction together with the control shaft 340. By this means, the relative phase differential between the input arm 311 and the output arm 321 becomes large, and the lift amount of the air intake valve 31 becomes large. However, when the control shaft 340 is displaced in the Lo direction indicated by the arrow in FIG. 2, the slider 350 is moved in the Lo direction together with the control shaft 340, and thus the relative phase differential between the input arm 311 and the output arm 321 becomes small, and the lift amount of the air intake valve 31 becomes small.

Various types of sensors for detecting engine operational states and switches for detecting operation by the driver are provided for the internal combustion engine 1 as shown in FIG. 1. For example, an accelerator sensor 71 provided for an accelerator pedal 70 detects the operation amount (accelerator operation amount ACCP) of the accelerator pedal 70. A crank angle sensor 72 provided in the vicinity of the crank shaft 15 outputs a pulse signal for each increment of rotation of a specified rotation angle of the crank shaft 15 and, based on this signal, the engine rotation speed NE is calculated. A throttle position sensor 73 detects degree of opening (degree of throttle opening) of the throttle valve 33 provided in the air intake path 30. An air flow meter 74 provided in the air intake path 30 detects an air intake amount GA of intake air introduced into the combustion chamber 13. A cam position sensor 75 provided in the vicinity of the air intake cam shaft 32 outputs a signal corresponding to a phase angle θ of the air intake cam 32a. Moreover, an ignition switch 76 for detecting an engine operation request by the driver of the vehicle is subjected to a switching operation by the driver and outputs a signal corresponding to the present switch position.

An electronic control unit 60 for executing various types of engine controls of the internal combustion engine 1 is connected to these various types of sensors and switches. The electronic control unit 60 receives detection signals from these various types of sensors and switches, executes various types of calculation processing for engine control, and outputs operational signals in response to the results of such calculations to the spark plug 14, the fuel injection valve 34, and the like to provide overall control of engine operation of the internal combustion engine 1.

Also, in the internal combustion engine 1 of the present embodiment, the throttle valve 33 provided in the air intake path 30 is maintained in an fully open state during engine operation, and the air intake amount GA is adjusted by change of the lift amount of the air intake valve 31 by the lift amount change mechanism 300. Based on the accelerator operation amount ACCP, the engine rotation speed NE, and the like, the electronic control unit 60 calculates the requested intake air amount and operates the lift amount change mechanism 300 based on this requested intake air amount.

Figure 3:
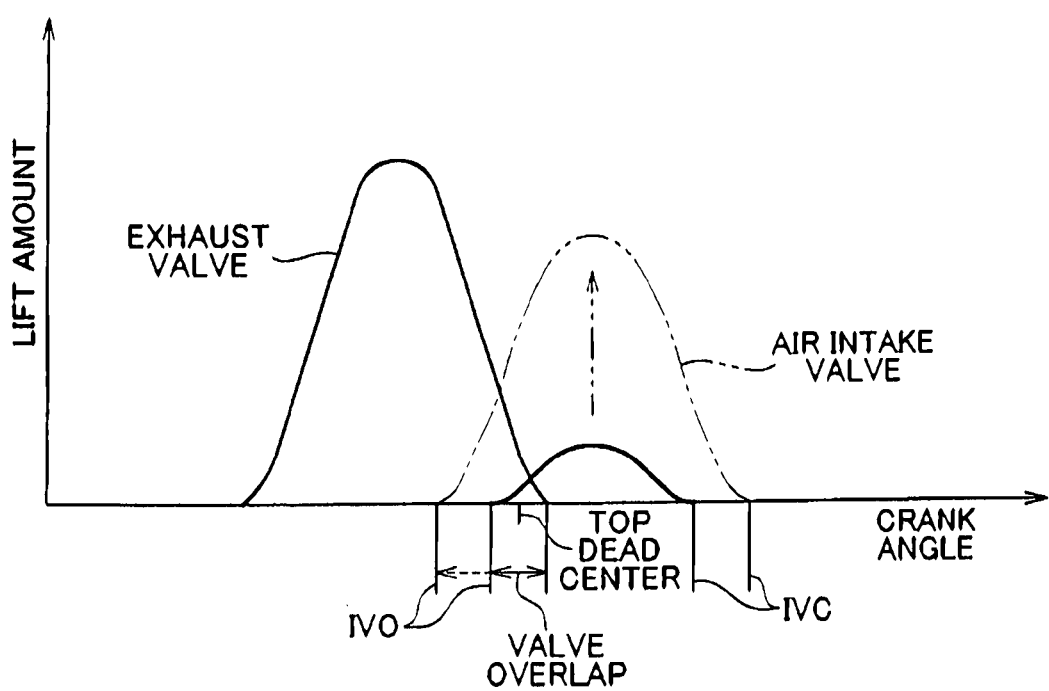
FIG. 3 is a graph showing a mode of change of the valve open time and valve closing time due to change of lift amount of the air intake valve.

However, when the lift amount of the air intake valve 31 is changed by operation of the lift amount change mechanism 300, as shown in FIG. 3, the valve open time IVO and the valve close time IVC change along with a change of the lift amount of the air intake valve 31. Specifically, as indicated by the chain double-dashed line in FIG. 3, when the lift amount of the air intake valve 31 is increased, the lift time becomes prolonged, and this results in advancement of the valve open time IVO and also delay of the valve close time IVC. This results in change of valve overlap between the air intake valve 31 and the exhaust valve 41 according to change of the lift amount.

Figure 4:
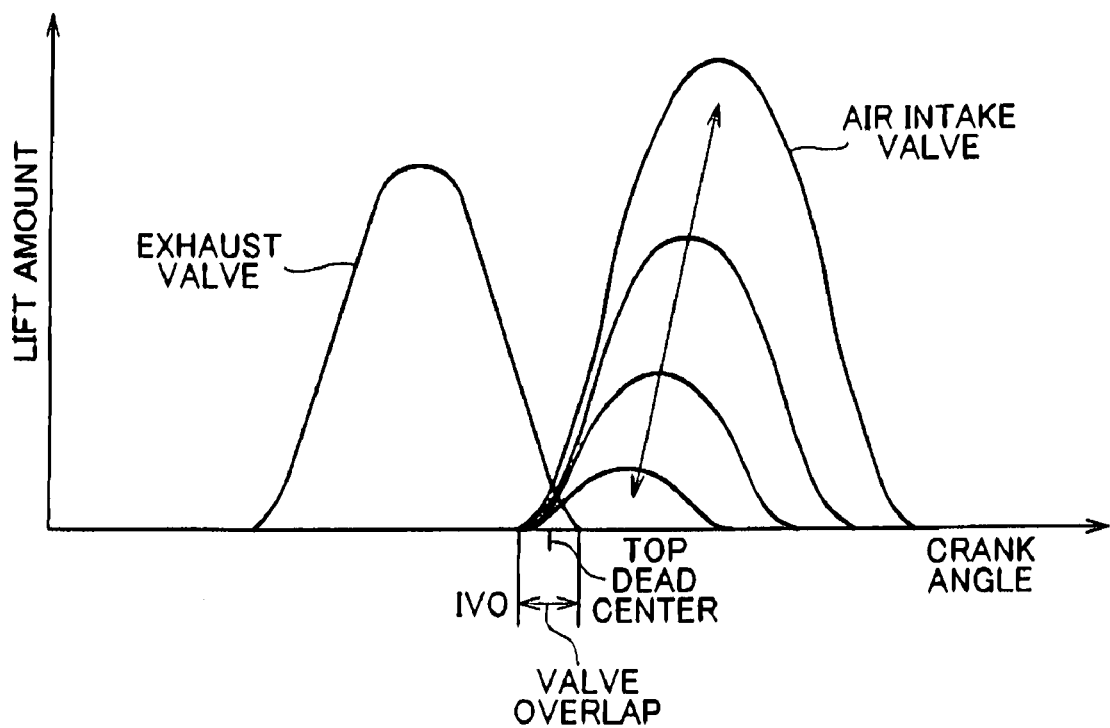
FIG. 4 is a graph showing mode of change of lift amount of the air intake valve according to coordinated control of the lift amount change mechanism and the valve timing change mechanism.

Thus, according to the internal combustion engine 1 of the present embodiment, by operation of the valve timing change mechanism 200 in response to the control state of the lift amount change mechanism 300, change of valve open time IVO with the change of the lift amount of air intake valve 31 is suppressed. Specifically, as shown in FIG. 4, when the lift amount of the air intake valve 31 is increased, valve timing is correspondingly delayed. However, when the lift amount is reduced, valve timing is correspondingly advanced. In this way, change of valve overlap can be suppressed even when the lift amount is changed.

When the valve timing change mechanism 200 is operated in response to the control state of the lift amount change mechanism 300 in this manner, that is, when coordinated control between the lift amount change mechanism 300 and the valve timing change mechanism 200 is performed, it becomes possible to cancel the change of valve overlap with change of lift amount of the air intake valve 31 and finely control lift amount of the air intake valve 31 and valve overlap thereof in response to the engine operational state.

Here, accurate detection of control state of the lift amount change mechanism 300 is required in order to adjust valve overlap to the desired amount and to change the lift amount of the air intake valve 31 in response to the engine operational state.

According to the internal combustion engine 1 of the present embodiment, a control state of the lift amount change mechanism 300 is detected based on the position of the control shaft 340. Operation of the control shaft 340 and the method of detection of the position of the control shaft 340 will be explained below in detail while referring to FIGS. 5 to 8.

Figure 5:
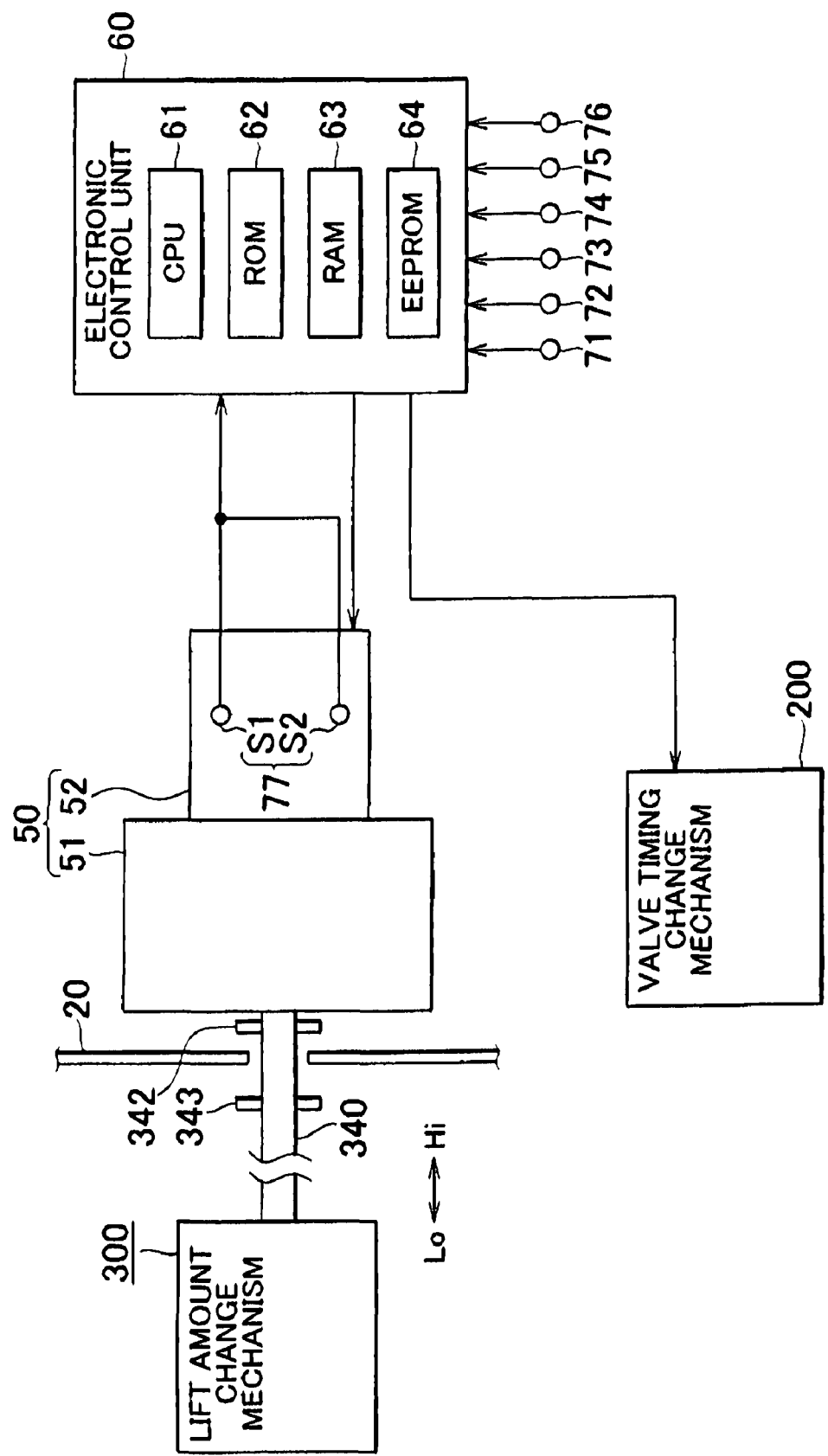
FIG. 5 is a schematic drawing showing abbreviated structure of the actuator and electronic control apparatus of the lift amount change mechanism according to the same embodiment.

FIG. 5 is a schematic drawing showing a simplified structure of an actuator 50 for operating the control shaft 340 and a control apparatus of the actuator 50. As shown in FIG. 5, at the base tip part (right side tip part in FIG. 5) of the control shaft 340, a brushless motor 52 is connected through a conversion mechanism 51 as the actuator 50. Rotational movement of the brushless motor 52 is converted to linear movement in the axial direction of the control shaft 340 by the conversion mechanism 51. The control shaft 340 is displaced in the axial direction and the lift amount change mechanism 300 operates through rotational movement within a certain rotation angle range of the above brushless motor 52 (e.g., within a rotational angle range of 10 rotations (0-3600°) of the brushless motor 52).

When the brushless motor 52 is rotated in the normal direction, the control shaft 340 moves in the Hi direction indicated by the arrow in FIG. 5, and the relative phase differential between the input arm 311 and the output arm 321 of the lift amount change mechanism 300 becomes large. Movement of the control shaft 340 in the Hi arrow direction is restrict by a Hi limit side stopper 343 provided on the control shaft 340. The position of contact of this Hi limit side stopper 343 with part of the cylinder head 20 is the movable limit position (referred to hereinafter as the "Hi limit") where the lift amount of the air intake valve 31 becomes largest.

However, when the brushless motor 52 is made to rotate in the opposite direction, the control shaft 340 moves in the Lo direction indicated by the arrow in FIG. 5, and the relative phase differential between the input arm 311 and the output arm 321 becomes small. Movement of the control shaft 340 in the Lo arrow direction is restricted by a Lo limit side stopper 342 provided on the control shaft 340. The position of contact of this Lo limit side stopper 342 with part of the cylinder head 20 is the movable limit position (referred to hereinafter as the "Lo limit") where lift amount of the air intake valve 31 becomes smallest.

The control shaft 340 is moved in the axial direction of the control shaft 340 in this manner, whereby lift amount of the air intake valve 31 changes according to the axial position of the control shaft 340. The axial position of the control shaft 340 changes in response to the rotation angle of the brushless motor 52 within the above specified rotation angle range.

Figure 6:
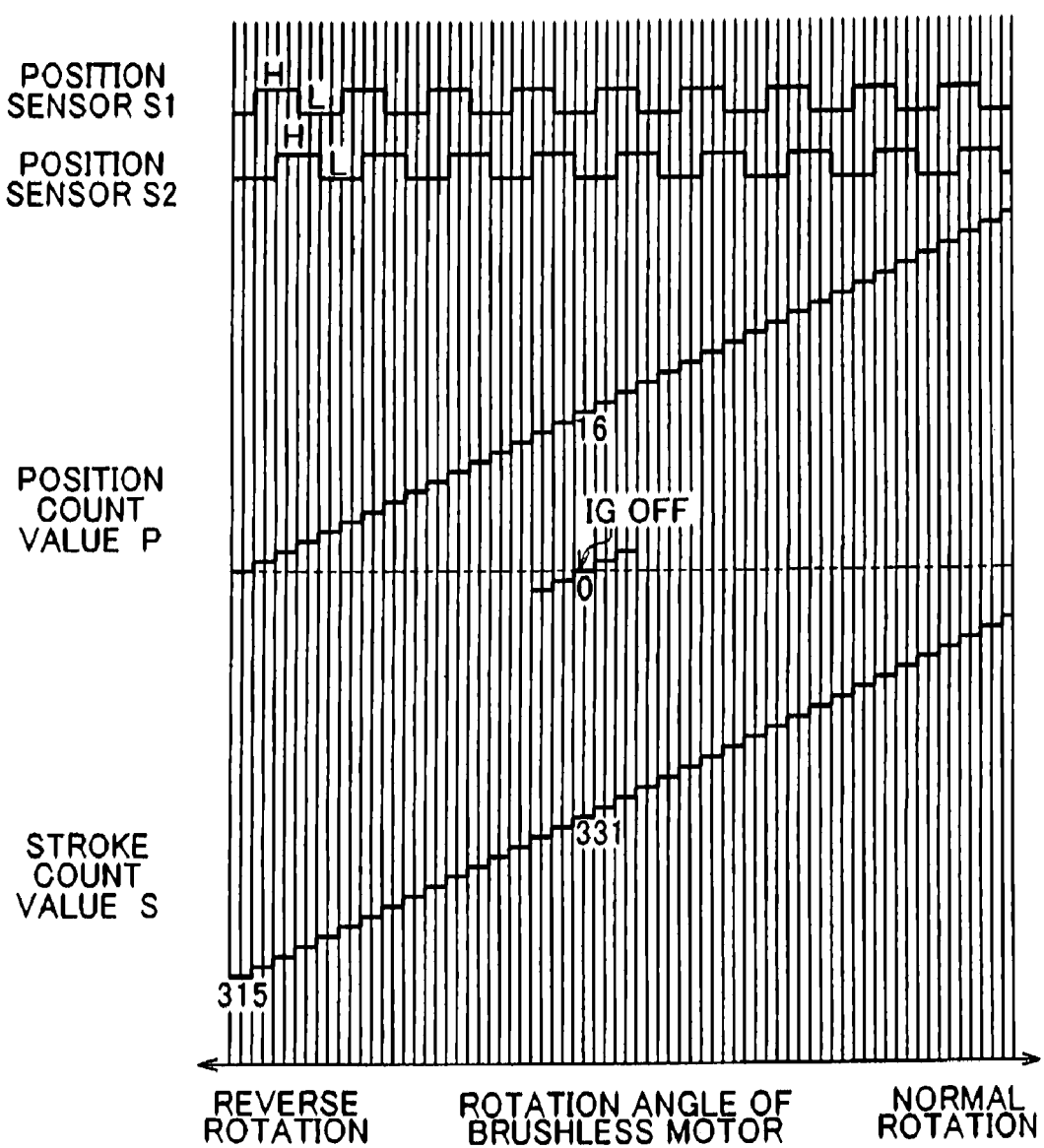
FIG. 6 is a timing chart showing the output signal of the position sensor, and mode of transition of position count value, and stroke count value as the brushless motor rotates.

The brushless motor 52 is provided with two position sensors S1 and S2 as a position detection sensor 77 for outputting a signal based on the rotation angle for detecting position of the control shaft 340. Each of the position sensors S1 and S2 alternately outputs pulse shaped signals (i.e., a high signal "H" and a low signal "L"), as shown in the upper part of FIG. 6, in response to changes of magnetic flux of a multipolar magnet with 48 poles that rotates together with the rotor of the brushless motor 52 during rotation of the brushless motor 52. FIG. 6 is a timing chart showing the signals of the position sensors S1 and S2 that accompany rotation of the brushless motor 52 and showing a transition mode of a position count value P and a stroke count value S.

Additionally, the pulse signals from both of the position sensors S1 and S2 are output with mutually displaced phases. During normal rotation, the rising edge and the falling edge of the pulse signal from the position sensor S1 occur before the rising edge and the falling edge, respectively, of the pulse signal from the position sensor S2. The edge of a pulse signal output from one of the sensors S1 and S2 is generated for each 7.5° of rotation of the brushless motor 52. The pulse signal from one of the sensors is generated displaced in phase by 3.75° of rotation of the brushless motor 52 relative to the pulse signal from the other sensor. Therefore, the edge interval of the pulse signals from the position sensors S1 and S2 becomes 3.75°.

As shown in FIG. 5, the above signals of each of the position sensors S1 and S2 are received by the above electronic control unit 60, which has been described above with reference to FIG. 1. Based on these signals, the electronic control unit 60 controls driving of the brushless motor 52. The electronic control unit 60 includes a central processing unit (CPU) 61, a read only memory (ROM) 62, a random access memory (RAM) 63, an EEPROM 64, which is a non-volatile memory capable of rewriting memory data.

In the above manner, the CPU 61 executes various types of calculation processing such as calculations needed for control of the fuel injection amount, control of the spark time, control of valve timing through operation of the valve timing change mechanism 200, which are required for engine operation of the internal combustion engine 1, as well as for operation of the lift amount change mechanism 300 (i.e., needed for operation of the brushless motor 52). Specifically, based on the signals from the position sensors S1 and S2, the position of the control shaft 340 is detected, a target position of the control shaft 340 corresponding to the requested intake air amount is calculated, and the brushless motor 52 is controlled such that position of the control shaft 340 reaches the target position. Various types of control programs and the like are stored beforehand in the ROM 62. The RAM 63 is a volatile memory that requires a backup battery for retention of memory data, and this RAM 63 is used as temporary memory storage of results of calculation of the CPU 61 and the like. The EEPROM 64 is capable of electrical rewriting memory data, and this memory does not require a backup battery in order to retain memory data thereof.

The method of detection of the axial position of the control shaft 340 will be explained in detail next while referring FIGS. 6 and 7. FIG. 7 is a table showing the relationship between the signals of each of the position sensors S1 and S2 and the increase or decrease of the position count value P.

As mentioned previously, the upper part of FIG. 6 shows the output pattern of the pulse signal output from the position sensors S1 and S2, respectively, during rotation of the brushless motor 52. The lower part of FIG. 6 shows the mode of transition of the position count value P and the stroke count value S that accompanies rotation of the brushless motor 52. The position count value P corresponds to the accumulated movement that indicates how much change of axial position of the control shaft 340 has occurred, that is, how much the control shaft 340 has moved from a base position with the rotation of the brushless motor 52 after ON operation (IG ON) of the ignition switch 76 performed at the time of start of the internal combustion engine 1. The stroke count value S is calculated based on a standard value Sst that indicates the base position and the position count value P, and the stroke count value S indicates the axial position of the control shaft 340. The standard value Sst is the stroke count value S at the time of previous engine operation stoppage, and the standard value Sst is stored in EEPROM 64 each time the engine operation stops.

During the position detection of the control shaft 340, firstly, based on the output pattern of the pulse signals from each of the position sensors S1 and S2, the position count value P is increased or decreased for each edge of these pulse signals. Specifically, as shown in FIG. 7, according to whether a rising edge or a falling edge of the pulse signal has occurred from one of the position sensors S1 and S2, and according to whether the output from the other sensor is a high signal H or a low signal L, +1 or −1 is added to the position count value P. In FIG. 7, the "↑" symbol indicates a rising edge of the pulse signal, and the "↓" symbol indicates a falling edge of the pulse signal. The position count value P obtained in this manner is a value that counts the edges of the pulse signals from each of the position sensors S1 and S2.

When the brushless motor 52 is undergoing normal rotation, as shown in FIG. 6, "1" is added to the position count value P for each edge of the pulse signals from the position sensors S1 and S2. When the brushless motor 52 is undergoing reverse rotation, "1" is subtracted from the position count value P for each of the above-mentioned edges. Because the position count value P is stored in the RAM 63 of the electronic control unit 60, as shown in FIG. 6, when the ignition switch 76 is subjected to OFF operation (IG OFF) and the electricity supply to the RAM 63 is stopped, the position count value P is reset to "0".

When the position count value P is calculated in this manner, the CPU 61 calculates the stroke count value S based on the calculated position count value P and the standard value Sst stored in the EEPROM 64. Specifically, the value obtained by adding the position count value P to the standard value Sst stored beforehand in the EEPROM 64 is calculated as a new stroke count value S. By updating of the stroke count value S in this manner, the position of the control shaft 340 is detected.

In this manner, as shown in FIG. 6, during normal rotation of the brushless motor 52, the stroke count value S increases in accordance with the increase of the position count value P. However, during reverse rotation of the brushless motor 52, the stroke count value S decreases in accordance with the decrease of the position count value P.

When the stroke count value S is calculated, the electronic control unit 60 compares the stroke count value S with a target stroke count value Sp as a target position of the control shaft 340. Then, rotation control of the brushless motor 52, that is, operational control of the lift amount change mechanism 300, is performed so that the stroke count value S matches the target stroke count value Sp.

The relationship between the actual position of the control shaft 340 and the stroke count value S when the position of the control shaft 340 is detected in this manner will be specifically explained below while referring to FIGS. 8A to 8C.

Figure 8A:
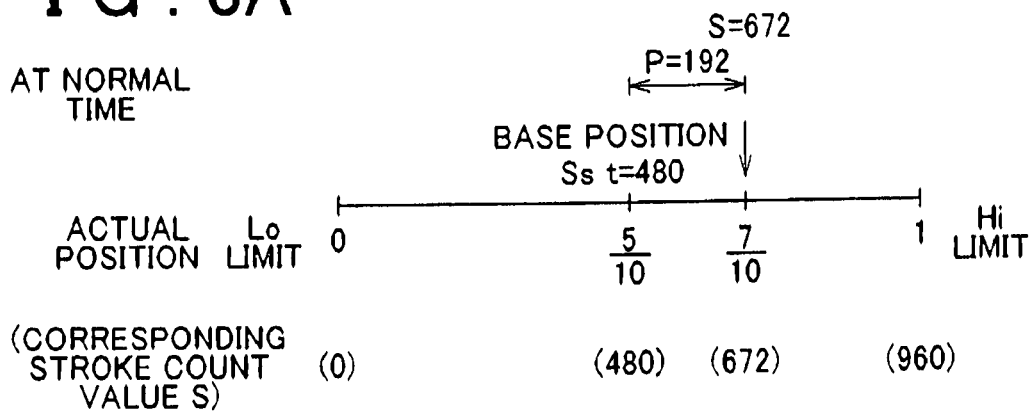
FIGS. 8A to 8C are explanatory drawings showing the relationship between position of the control shaft and the stroke count value.
Figure 8B:
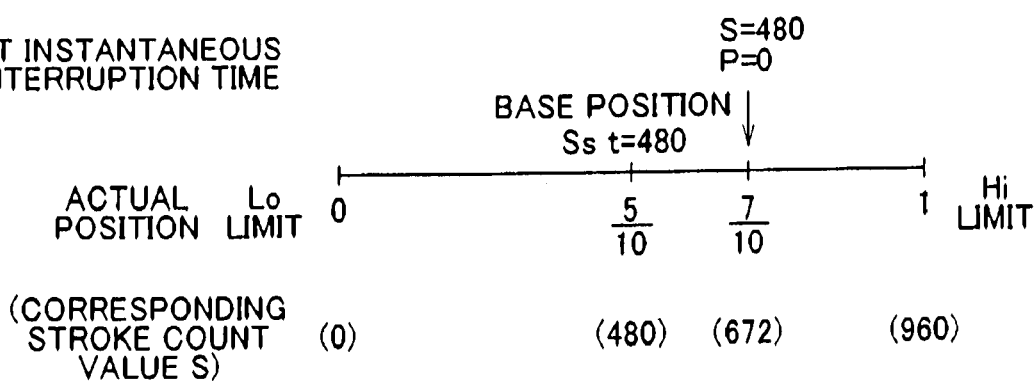
Figure 8C:
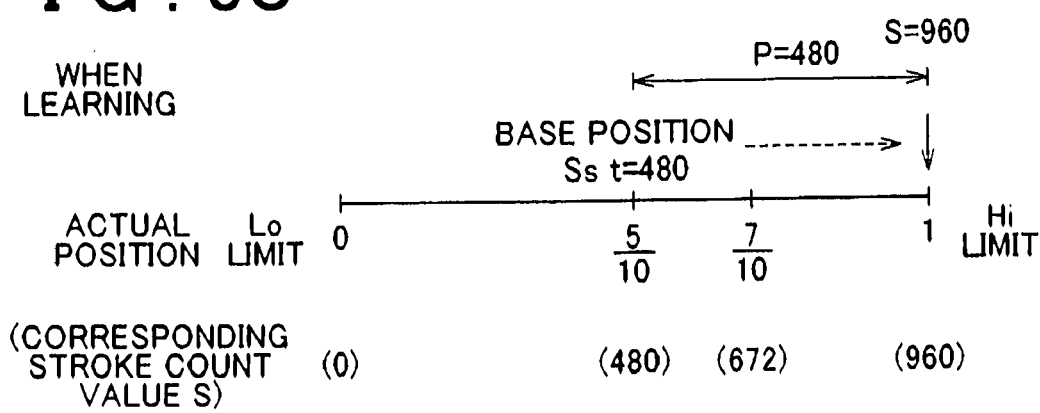

FIGS. 8A to 8C are explanatory drawings showing the relationship between the actual position of the control shaft 340 and the value of the stroke count value S when the lift amount change mechanism 300 is operated in the movable range corresponding to 10 rotations (0-3600°) of the brushless motor 52.

As described above, in the internal combustion engine 1 of the present embodiment, the position count value P and the stroke count value S are increased or decreased by "1" for each 3.75° rotation of the brushless motor 52. For this reason, when the stroke count value S corresponding to the Lo limit is assumed to be "0", the stroke count value S corresponding to the Hi limit becomes "960". The following explanation will be provided for the case taking the base position (Sst=480) as the intermediate position between the Lo limit and the Hi limit.

For example, when the control shaft 340 as shown in FIG. 8A is operated toward the Hi limit side by an amount just corresponding to two rotations) (720°) of the brushless motor 52 and moves to the position indicated by the arrow away from the base position, the position count value P becomes "192", and the stroke count value S, becomes "672". In this way, when assuming the distance from the Lo limit to the Hi limit to be "1", the control shaft 340 is detected to be positioned at "672/960" toward the Hi limit (i.e. detected to be at the "7/10" position).

However, when instantaneous interruption of electrical power supply (so-called instantaneous interruption) occurs due to failure of the connection of the electrical power line supplying electrical power to the electronic control unit 60 and the like, there are instances where the position count value P stored in the RAM 63 disappears. When the position count value P disappears due to this type of instantaneous interruption, that is, when the resultant position count value P becomes the initial value "0", for example, the stroke count value S becomes displaced, i.e. the position of the control shaft 340 understood by electronic control unit 60 becomes displaced from the actual position of the control shaft 340.

Specifically, when the position count value P becomes "0" due to instantaneous interruption, despite the actual position of the control shaft 340 toward the Hi limit being "7/10" as indicated by the arrow in FIG. 8B, the resultant stroke count value S becomes "480". In this way, the electronic control unit 60 falsely recognizes that the control shaft 340 is at the base position (i.e. at the intermediate position between the Lo limit and the Hi limit).

When the position of the control shaft 340 is erroneously detected in this manner, a discrepancy occurs between the lift amount of the air intake valve 31 estimated based on the erroneously detected position and the actual lift amount of the air intake valve 31.

For this reason, when coordinated control of the valve timing change mechanism 200 is performed based on the control state of the lift amount change mechanism 300 understood by the electronic control unit 60, the valve timing set by the valve timing change mechanism 200 becomes unsuitable for the engine operational state. As a result, the engine operational state becomes unstable and, in some cases, there is concern that this may cause occurrence of misfiring, knocking, and the like.

Figure 14A:
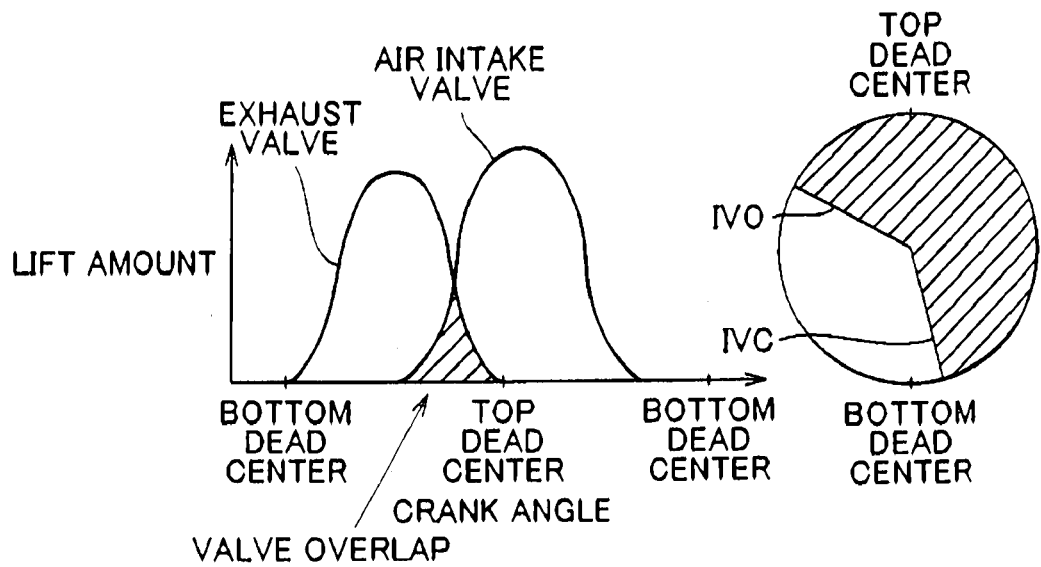
FIG. 14A is a graph showing a specific example of valve characteristics for which misfiring readily occurs.
Figure 14B:
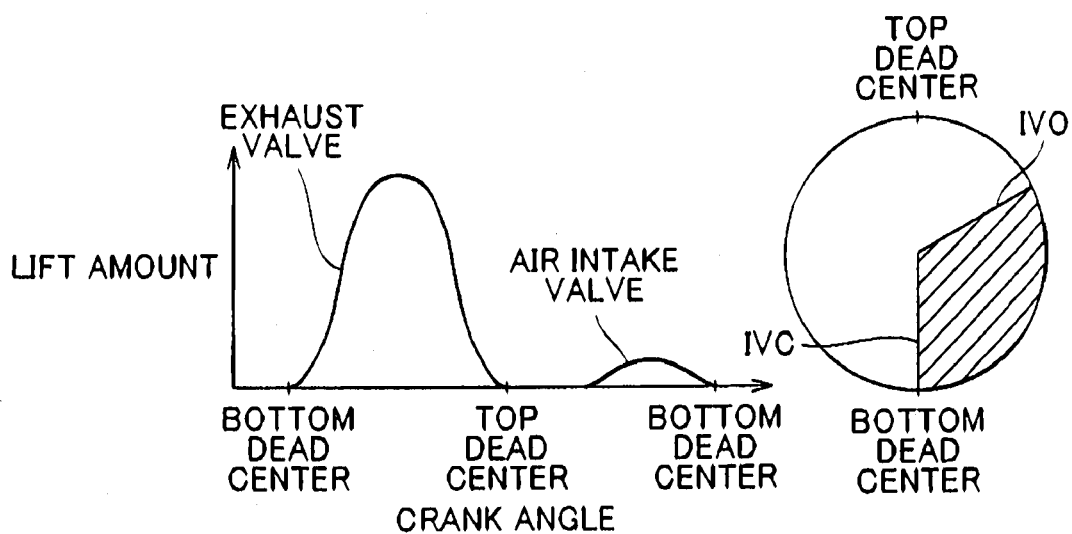
FIG. 14B is a graph showing a specific example of valve characteristics for which knocking readily occurs.

Specifically, if the valve timing of the air intake valve 31 is shifted to the advance side when lift amount of the air intake valve 31 is very large as shown in FIG. 14A, valve open time IVO of the air intake valve 31 becomes early, valve overlap becomes excessively large and the internal EGR amount increases. As a result, oxygen supplied for combustion becomes insufficient, combustion becomes unstable, and misfiring readily occurs. Additionally, when valve timing of the air intake valve 31 is shifted to the delay side when lift amount of the air intake valve 31 is very small as shown in FIG. 14B, the valve open time IVO of the air intake valve 31 comes on or after the top dead center and the valve close time IVC becomes near the bottom dead center. As a result, negative pressure of the combustion chamber 13 increases at the time of valve opening of the air intake vale 31, flow rate of air introduced to the combustion chamber 13 increases, and the air intake valve 31 is closed to start compression in the vicinity of the bottom dead center. Thus, temperature and pressure within the combustion chamber 13 readily rise and knocking readily occurs.

However, to suppress disappearance of the position count value P by this type of instantaneous interruption, adoption has been considered of a configuration in which the value of the position count value P is stored in the EEPROM 64 that does not require a backup battery for retention of memory data. However, the number of times of rewriting memory data to the EEPROM 64 is limited, and if the EEPROM 64 is used to store the position count value P that changes successively during operation of the control shaft 340, durability of the EEPROM 64 markedly declines, and thus adoption of this type of configuration is not realistic.

Thus, for the internal combustion engine 1 according to the present embodiment, by executing the maximum position learning in the below described manner, the discrepancy between the stroke count value S and the actual position of the control shaft 340 caused by the disappearance of the position count value P in this manner is corrected.

According to the maximum position learning, when the position count value P disappears due to an instantaneous interruption, the control shaft 340 is displaced toward the Hi limit side by constant operational force as indicated by the dashed line arrow in FIG. 8C. At this time, the lift amount of the air intake valve 31 gradually increases, and therefore, a shift is made to throttle control in which the air intake amount GA is regulated by the throttle valve 33 provided in the air intake path 30, so that the excessive increase of air intake amount GA accompanying increase of the lift amount is suppressed. Then, the position at which the Hi limit side stopper 343 contacts the cylinder head 20 and movement of the control shaft 340 stops is learned as the Hi limit For example, the value of the position count value P is set to "480" such that the stroke count value S at this position becomes "960".

By executing the maximum position learning in which the control shaft 340 is operated toward the Hi limit side and the position of stoppage is learned as the Hi limit, the discrepancy between the actual position of the control shaft 340 and the position of the control shaft 340 understood by the electronic control unit 60 can be eliminated.

Moreover, when the discrepancy between the actual position of the control shaft 340 and the position of the control shaft 340 understood by the electronic control unit 60 is estimated to be large in the internal combustion engine 1 of the present embodiment (during the time period when the discrepancy is estimated to be large, i.e., during a time period when it is estimated that the detected position of the movable part is different from the position of the movable part to be detected), coordinated control of the lift amount change mechanism 300 and the valve timing change mechanism 200 is forbidden.

Figure 9:
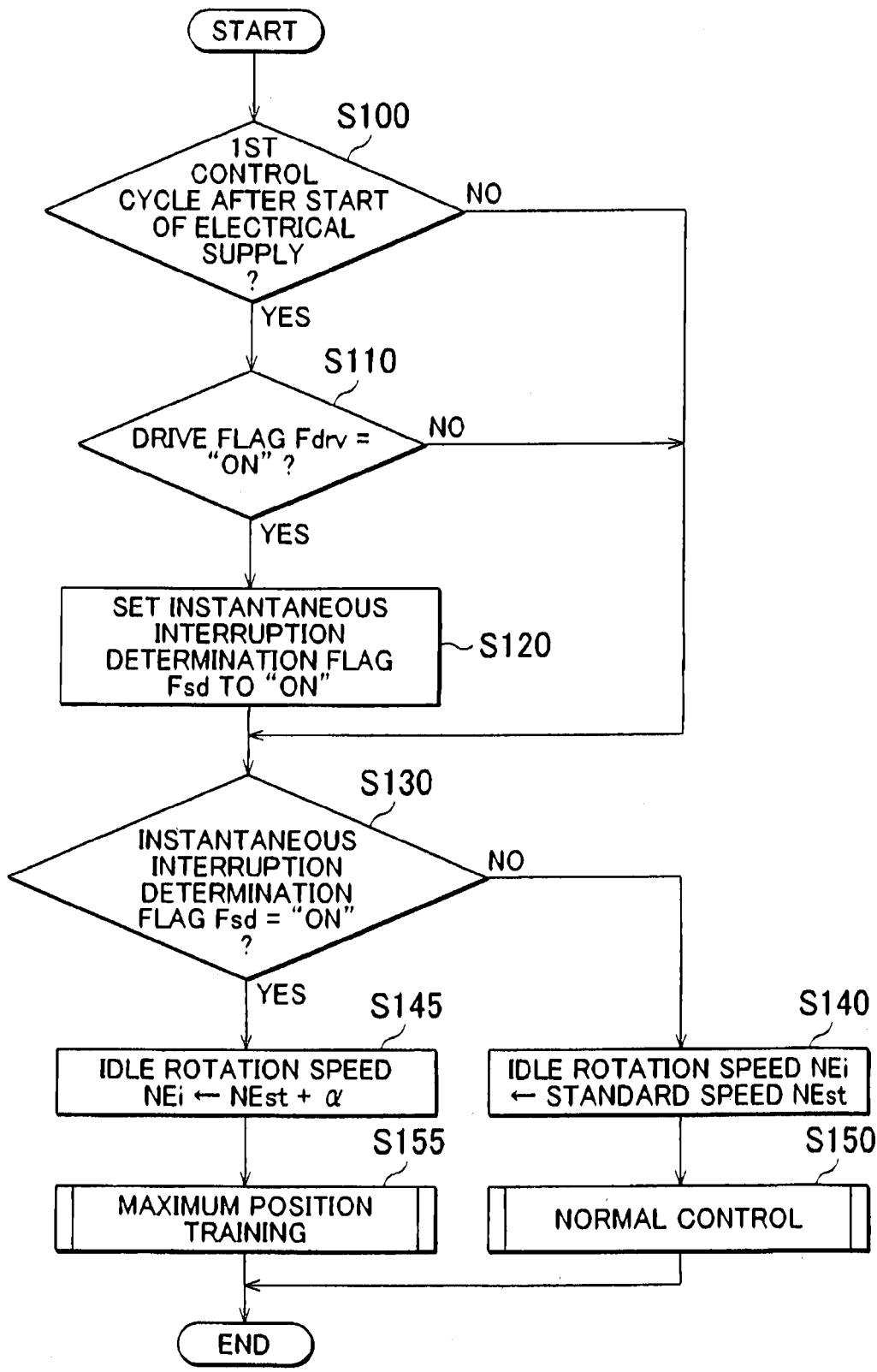
FIG. 9 is a flowchart showing the sequence of processing that accompanies control of the lift amount change mechanism according to the same embodiment.
Figure 10:
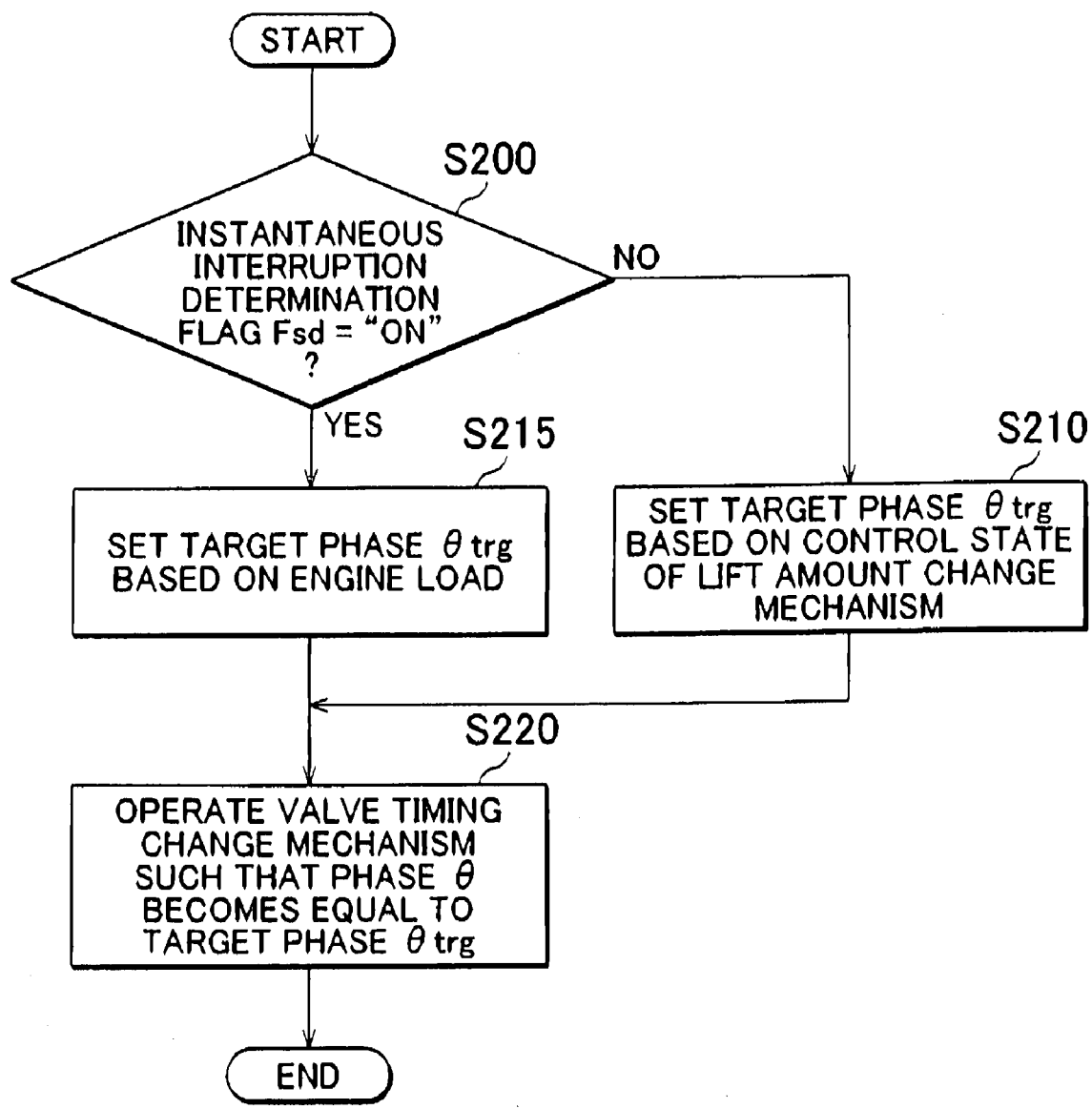
FIG. 10 is a flowchart showing the sequence of processing that accompanies control of the valve timing change mechanism according to the same embodiment.

A control mode of the valve timing change mechanism 200 and a control mode of the lift amount change mechanism 300 for the maximum position learning and forbidding of coordinated control will be explained while referring to FIGS. 9 and 10.

Firstly, control of the lift amount change mechanism 300 using the maximum position learning will be explained while referring to FIG. 9. FIG. 9 is a flow chart showing a sequence of learning according to such control. This learning is executed repeatedly by the electronic control unit 60 during engine operation.

When the learning starts, firstly, in step S100, determination is made as to whether this is the first control cycle after supply of electric power to the electronic control unit 60 is started. If this is determined at step S100 to be the first control cycle after supply of electrical power to the electronic control unit 60 is started (YES in step S100), then learning proceeds to step S110 and determination is made as to whether a drive flag Fdrv is ON. The drive flag Fdrv is set to ON at the time of engine startup and is set to OFF when engine operation is stopped, and this value is stored in EEPROM 64 that does not require a backup battery for retention of memory data. Moreover, electrical power is supplied to the electronic control unit 60 prior to startup of the engine. For this reason, in step S110, when the drive flag Fdrv is set to ON, it is estimated that supply of electric power to the electronic control unit 60 has restarted without going through normal engine operation completion (i.e. that the supply of electrical power has restarted after the occurrence of an instantaneous interruption).

If the drive flag Fdrv is determined to be ON at step S110 (YES in step S110 (i.e. it is determined that an instantaneous interruption has occurred immediately beforehand)), learning proceeds to step S120, and an instantaneous interruption determination flag Fsd is set to ON. The instantaneous interruption determination flag is set to ON when it is determined that an instantaneous interruption has occurred in the above described manner, and the instantaneous interruption determination flag is set to OFF when the above described maximum position learning has finished. The instantaneous interruption determination flag Fsd is stored in RAM 63 and is set to OFF in the initial state (i.e. at the time of engine startup). When the instantaneous interruption determination flag Fsd has been set to ON in this manner, learning proceeds to step S130.

However, if the drive flag Fdrv is determined to be OFF in step S110 (NO in step S110), it is estimated that supply of electricity has started to the electrical control unit 60 after undergoing a normal engine operation stoppage (i.e. not an occurrence of an instantaneous interruption), step S120 is skipped, and learning proceeds to step S130.

Moreover, if determination is made in step S100 that this is not the first control cycle after the start of the electrical supply to the electrical control unit 60 (NO in step S100), step S110 and step S120 are skipped, and learning proceeds to step S130.

At step S130, determination is made as to whether the instantaneous interruption determination flag Fsd is ON. If the instantaneous interruption determination flag Fsd is determined to be OFF in step S130 (NO in step S130), no instantaneous interruption has occurred, and therefore learning proceeds to step S140, and the idle rotation speed NEi is set to the standard rotation speed NEst which is the normal idle rotation speed.

Execution then proceeds to step S150, the target position of the control shaft 340 is set based on the requested air intake amount in the previously described manner, and normal control in which the lift amount of the air intake valve 31 is changed by operating the control shaft 340 is performed. When the control shaft 340 has operated in this manner, this learning ends.

However, if the instantaneous interruption determination flag Fsd has been determined to be ON in step S130 (YES in step S130), a discrepancy is estimated to have occurred between the actual position of the control shaft 340 and the position of the control shaft 340 understood by the electronic control unit 60 based on the value of the stroke count value S due to occurrence of an instantaneous interruption, and the discrepancy between the actual position of the control shaft 340 and the position of the control shaft 340 understood by the electronic control unit 60 is estimated to be large. Execution then proceeds to step S145, the idle rotation speed NEi is set to a value obtained by adding a specific amount α to the standard rotation speed NEst, the above maximum position learning is executed in step S155, and the learning ends.

By repeatedly executing learning in this manner, determination is made as to whether an instantaneous interruption has occurred. Then, based on the result of determination in the above manner as to whether an instantaneous interruption has occurred, if the discrepancy between the actual position of the control shaft 340 and the position of the control shaft 340 understood by the electronic control unit 60 is estimated to be large, the maximum position learning is executed.

Control of the valve timing change mechanism 200 for forbidding of coordinated control will be explained next while referring to FIG. 10. FIG. 10 is a flow chart showing a sequence of processing for this control. This processing is executed repeatedly by the electronic control unit 60 during engine operation.

When this processing starts, firstly, in step S200, determination is made as to whether the instantaneous interruption flag Fsd is set to ON. If the instantaneous interruption flag Fsd in step S200 is determined to be set to OFF, an instantaneous interruption is estimated not to have occurred, the target valve overlap is set based on the engine load calculated based on the air intake amount GA and the engine rotation speed NE and the valve timing change mechanism 200 is subjected to coordinated control based on the control state of the lift amount change mechanism 300. That is to say, a target phase θtrg of the air intake cam 32a is set based on the engine load and the stroke count value S. Basically, based on position of the control shaft 340, the target phase θtrg is shifted more to the delay side as the lift amount of the air intake valve 31 is larger, and the target phase θtrg is shifted more to the advance side as the lift amount of the air intake valve 31 is smaller. In this way, the change of the valve open time IVO of the air intake valve 31 accompanying the change of the lift amount is compensated for by a change of the phase θ of the air intake cam 32a. Then, together with this compensation, the target phase θtrg is shifted further to the advance side or the delay side such that the amount of valve overlap is suitable for the engine operational state.

When the target phase θtrg for coordinated control is set in this manner, execution proceeds to step S220, the valve timing change mechanism 200 is operated such that the phase θ of the air intake cam 32a detected by the cam position sensor 75 matches the target phase θtrg, and the processing ends.

Figure 11:
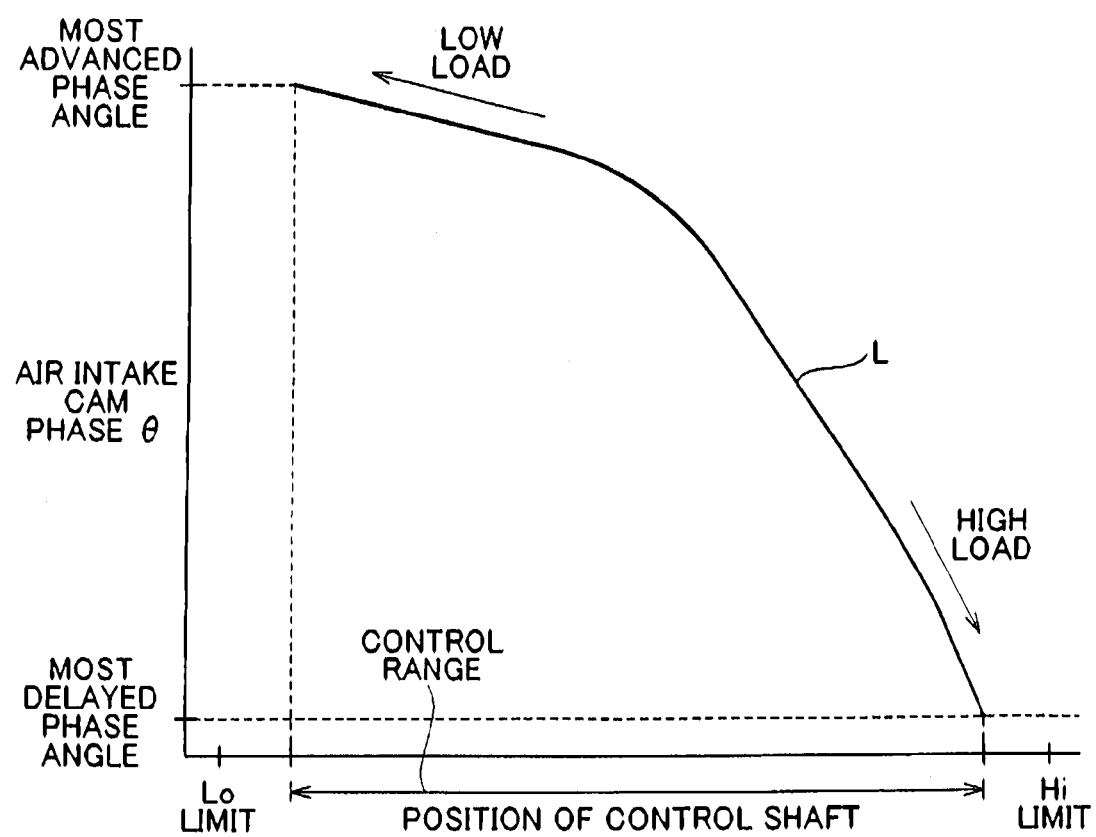
FIG. 11 is a graph showing mode of change of position of the control shaft and phase of the air intake cam due to coordinated control of the same embodiment.

The position of the control shaft 340 and the phase θ of the air intake cam 32a undergoing coordinated control in this manner change as per the curve L shown in FIG. 11. Basically, as the engine load becomes larger, the control shaft 340 is operated toward the Hi limit side, and the phase θ of the air intake cam 32a is changed toward the delay side. In this way, the lift amount of the air intake valve 31 becomes large and the air intake amount GA is increased. However, as the engine load becomes smaller, the control shaft 340 is operated toward the Lo limit side, and the phase θ of the air intake cam 32a is changed toward the advance side. By this means, the lift amount of the air intake valve 31 becomes small and the air intake amount GA decreases. As shown in FIG. 11, in the internal combustion engine 1 of the present embodiment, the control range within which the control shaft 340 is moved when the air intake amount GA is regulated may be set smaller than the movable range of the control shaft 340 restricted by the Hi limit and the Lo limit.

Figure 12:
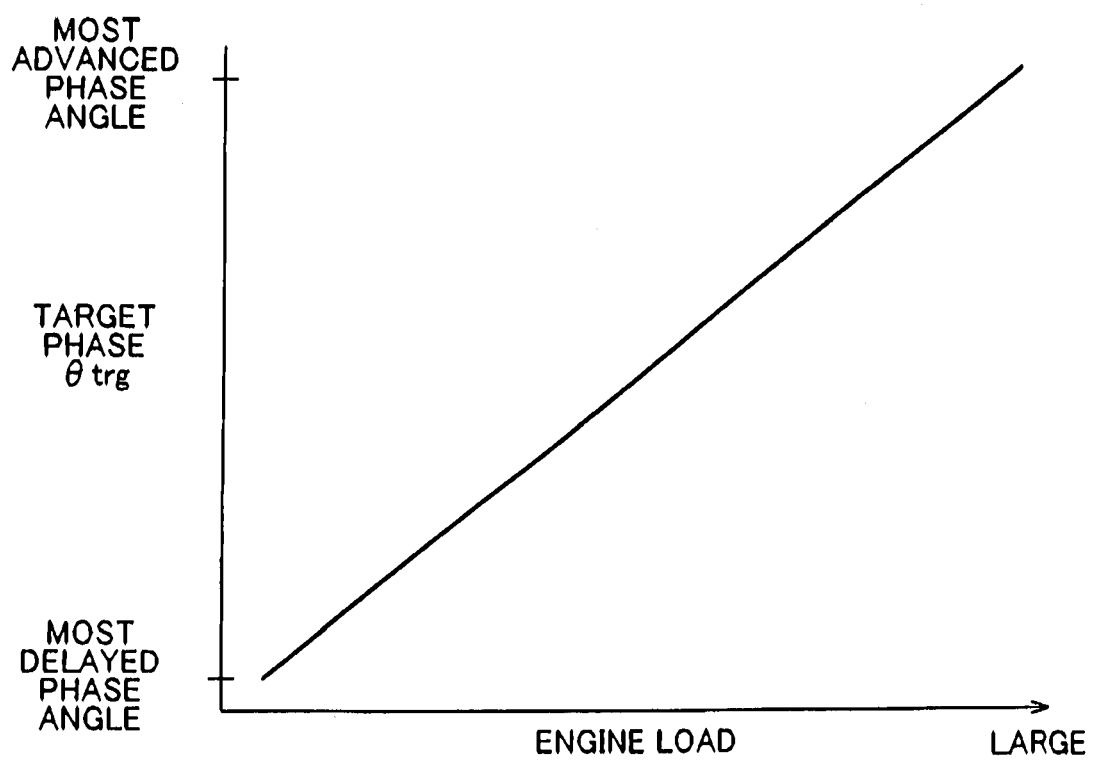
FIG. 12 is a graph showing the relationship between engine load and target phase of the air intake cam due to forbidding coordinated control according to the same embodiment.

However, if the instantaneous interruption determination flag Fsd is determined to be set to ON in step S200 (NO in step S200), then the control proceeds to step S215, and the target phase θtrg is set based on the engine load without depending on the control state of the lift amount change mechanism 300. Specifically, the electronic control unit 60 refers to a map used for calculations that is stored in the ROM 62 of the electronic control unit 60 and sets the target phase θtrg. As shown in FIG. 12, this map is defined so that the target phase θtrg is advanced in proportion to the engine load such that the target phase θtrg becomes larger as the engine load becomes larger and the target phase θtrg becomes smaller as the engine load becomes smaller.

When the target phase θtrg has been set based on the engine load in this manner, the valve timing change mechanism 200 is operated in step S220 such that the phase θ of the air intake valve 31 matches the target phase θtrg and the processing ends.

By repeatedly executing processing in this manner, determination is made as to whether an instantaneous interruption has occurred and then, based on the results of this determination, coordinated control is forbidden if the discrepancy between the actual position of the control shaft 340 and the position of the control shaft 340 understood by the electronic control unit 60 is estimated to be large.

Figure 13:
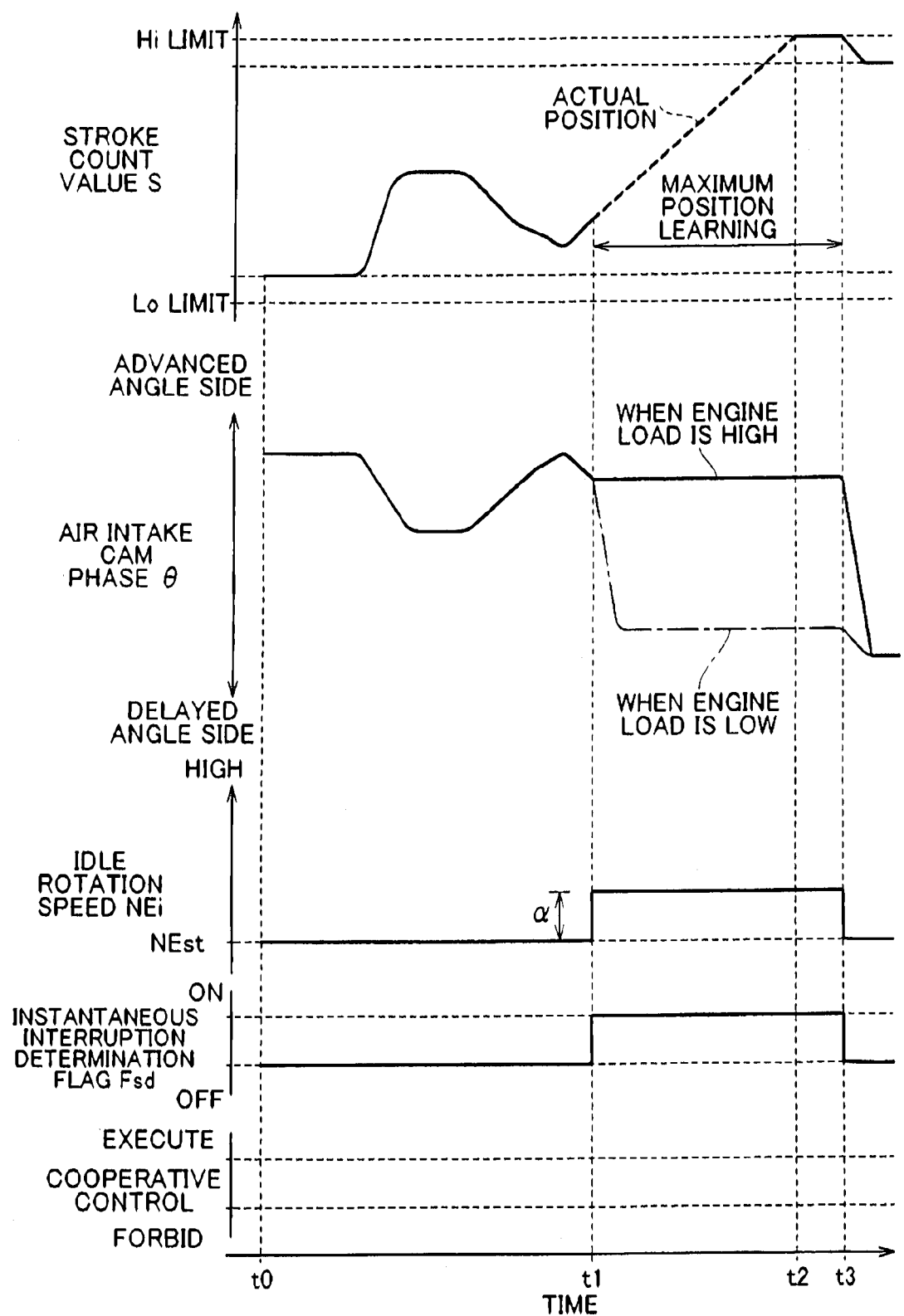
FIG. 13 is a timing chart showing a mode of change of phase of the air intake cam and stroke count value due to forbidding coordinated control according to the same embodiment.

Operation when coordinated control has been forbidden in this manner will be explained while referring to FIG. 13. FIG. 13 is a timing chart showing a mode of change of the phase θ of the air intake cam 32a and the stroke count value S accompanying the forbidding of coordinated control.

As shown in FIG. 13, as long as no instantaneous interruption has occurred (time t0-t1), that is, when the stroke count value S is equal to a value corresponding to the actual position of the control shaft 340, coordinated control is executed, and the phase θ of the air intake cam 32a is changed along with a change of the value of the stroke count value S.

However, when an instantaneous interruption occurs at time t1, and the value of the position count value P stored in the RAM 63 disappears, the value of the stroke count value S becomes unclear, and the instantaneous interruption determination flag Fsd is set to ON.

When the instantaneous interruption determination flag Fsd is set to ON and the discrepancy between the actual position of the control shaft 340 and the position of the control shaft 340 understood by the electronic control unit 60 is estimated to be large, coordinated control is forbidden and the idle rotation speed NEi is increased by a specific amount α.

Then, the maximum position learning starts at time t1 and the control shaft 340 is operated toward the Hi limit side. During the period of execution of the maximum position learning in this manner (time t1 to t3), the air intake amount GA is regulated by the throttle valve 33, and the phase θ of the air intake cam 32a is changed based on the engine load. For example, when the engine load is high as indicated by the solid line in FIG. 13, the phase θ of the air intake cam 32a is shifted toward the advance side. However, when the engine load is low as indicated by the dashed line in FIG. 13, the phase θ of the air intake cam 32a is shifted toward the delay side.

When the control shaft 340 contacts the Hi limit and displacement stops at time t2, the position of the control shaft 340 is learned as the position corresponding to the Hi limit, and the value of the stroke count value S is corrected (time t2 to t3). Then at time t3, the maximum position learning ends, and when the value of the stroke count value S becomes equal to the value corresponding to the actual position of the control shaft 340, the instantaneous interruption determination flag Fsd is set to OFF, forbidding coordinated control is canceled, and the idle rotation speed NEi is set to the standard rotation speed NEst.

Then, at time t3, coordinated control is again executed for control of the lift amount change mechanism 300 and control of the valve timing change mechanism 200, and therefore the phase θ of the air intake cam 32a is changed with a change of the value of the stroke count value S.

The advantageous effects listed below are obtained according to the present embodiment as explained previously.

(1) When engine load is low (i.e. when the amount of air introduced into the combustion chamber 13 is small during the air intake stroke), due to low oxygen in the combustion chamber 13, combustion becomes unstable, and misfiring readily occurs. However, when engine load is high (i.e. when the amount of air introduced into the combustion chamber 13 is high during the air intake stroke), temperature and pressure in the combustion chamber 13 readily increase during the compression stroke, and therefore knocking readily occurs. Thus, according to the above embodiment, based on a determination as to whether an instantaneous interruption has occurred, when the discrepancy between the actual lift amount and the lift amount of the air intake valve 31 understood by the electronic control unit 60 is estimated to be large, coordinated control is forbidden and operation of the valve timing change mechanism 200 is made based on the engine load. For this reason, setting of the valve timing based on an inaccurate control state of the lift amount change mechanism 300 is avoided, the valve timing can be changed so as to suppress the occurrence of misfiring when the engine load is low, and the valve timing can be changed so as to suppress the occurrence of knocking when the engine load is high. As a result, even when the electronic control unit 60 has become unable to accurately understand the lift amount of the air intake valve 31, it is possible to suppress the occurrence of misfiring and knocking.

(2) When the valve timing of the air intake valve 31 is shifted to the advance side while the lift amount of the air intake valve 31 is extremely high, valve overlap is excessively large, oxygen supplied for combustion becomes insufficient, combustion becomes unstable, and misfiring readily occurs. However, when the valve timing of the air intake valve 31 is shifted to the delay side while the lift amount of the air intake valve 31 is extremely low, the valve open time IVO of the air intake valve 31 comes at or after the top dead center, and the valve close time IVC comes in the vicinity of the bottom dead center, so that increase of temperature and pressure within the combustion chamber 13 readily occurs, and knocking readily occurs. Thus, according to the above embodiment, when the discrepancy between the actual position of the control shaft 340 and the position of the control shaft 340 understood by the electronic control unit 60 is estimated to be large, the valve timing of the air intake valve 31 is shifted more to the delay side as the engine load is smaller, and valve timing of the air intake valve 31 is shifted more to the advance side as the engine load is larger. Due to this configuration, when the engine load is low (i.e. when misfiring readily occurs although knocking tends not to occur), the valve timing of the air intake valve 31 is shifted toward the delay side, and even when the lift amount of the air intake valve 31 cannot be accurately understood, it is possible to avoid that valve characteristics of the air intake valve 31 are set to valve characteristics where misfiring readily occurs, and the occurrence of misfiring can be suitably suppressed. Also, when the engine load is high (i.e. when knocking readily occurs although misfiring tends not to occur), the valve timing of the air intake valve 31 is shifted toward the advance side, and even when the lift amount of the air intake valve 31 cannot be accurately understood, it is possible to avoid that valve characteristics of the air intake valve 31 are set to valve characteristics where knocking readily occurs, and the occurrence of knocking can be suitably suppressed.

(3) When an instantaneous interruption occurs and the discrepancy between the actual position of the control shaft 340 and the position of the control shaft 340 understood by the electronic control unit 60 is estimated to be large, the maximum position learning is executed. For this reason, it becomes possible to eliminate the discrepancy between the actual position of the control shaft 340 and the position of the control shaft 340 understood by the electronic control unit 60. Also, the maximum position learning is performed by operating the control shaft 340 such that the lift amount increases while the air intake amount GA is regulated using the throttle valve 33. It is thus possible to suppress the air intake amount GA from becoming excessively large due to the throttling operation of the throttle valve 33 and the maximum position learning can be executed even during engine operation.

Additionally, when the air intake amount GA is regulated according to the throttle valve 33, change of engine output is possible even during execution of the maximum position learning by changing the degree of opening of the throttle valve 33. When the degree of opening of the throttle valve 33 is changed in this manner, the respective possibilities of occurrence of misfiring and knocking change due to the change of the engine load. According to the configuration of the above embodiment in which the valve timing is changed based on the engine load, the valve timing is changed according to the possibilities of occurrence of misfiring and knocking that accompany change of the engine load, and it becomes possible to suitably suppress the occurrence of misfiring and knocking.

(4) When the lift amount of the air intake valve 31 is changed by operating the control shaft 340 over the entire movable range of the control shaft restricted by the Lo limit side stopper 342 and the Hi limit side stopper 343, a shock is caused every time movement of the control shaft 340 is stopped by the Lo limit side stopper 342 and the Hi limit side stopper 343 as the lift amount is changed, and thus there is concern that this may cause a lowering of durability of the lift amount change mechanism 300. Therefore, according to the above embodiment, the lift amount is changed by causing displacement of the control shaft 340 in a specified control range that is set to a range that is narrower than the movable range. According to this configuration, it becomes possible to avoid the occurrence of a shock that occurs due to the stoppage of movement of the control shaft 340 by the Lo limit side stopper 342 and the Hi limit side stopper 343 when the lift amount is changed, and thus improvement of durability of the lift amount change mechanism 300 is possible.

(5) During an extremely low load such as when idling, combustion becomes unstable and misfiring readily occurs. For this reason, by raising the idle rotation speed NEi according to the above embodiment, it becomes possible to stabilize combustion and more suitably suppress the occurrence of misfiring during the idling state. Moreover, when the maximum position learning is executed, due to operation of the control shaft 340 up to the Hi limit where the lift amount of the air intake valve 31 becomes largest according to execution of the maximum position learning, valve overlap becomes excessively high and this results in a state where misfiring occurs particularly readily. Thus, by adoption of a configuration that causes rising of the idle rotation speed NEi as per the above embodiment, even during execution of the maximum position learning where misfiring occurs particularly readily, it is possible to suitably suppress the occurrence of misfiring.

The above embodiment can be carried out according to the below described aspects by appropriate modification of the above embodiment. A configuration has been described above in which, when the discrepancy between the actual position of the control shaft 344) and the position of the control shaft 340 understood by the electronic control unit 60 is estimated to be large, the idle rotation speed NEi is increased by a specified amount α. The value of the specified amount α can be changed appropriately as long as the value is such that it is possible to suppress the occurrence of misfiring.

Additionally, even when the configuration that causes increase of the idle rotation speed NEi in this manner is not adopted, by adoption of a configuration that at least changes valve timing based on the engine load, suppression of the occurrence of misfiring and knocking is possible even when accurate understanding of the lift amount of the air intake valve 31 by the electronic control unit 60 becomes impossible.

In the above description of the above embodiment, a configuration is shown that forbids coordinated control, and, referring to a calculation map that is defined so that the amount of advancement becomes higher in proportion to the engine load as shown in FIG. 12, the target phase θtrg is shifted more to the delay side as the engine load becomes lower, and the target phase θtrg is shifted more to the advance side as the engine load become higher. In contrast, the mode of setting the target phase θtrg relative to engine load can be suitably changed. For example, a configuration can be adopted in which the valve timing of the air intake valve 31 is shifted to the advance side when the engine load becomes higher than or equal to a specified load. When this type of configuration is adopted, during high loads when knocking readily occurs, at least the occurrence of knocking can be suppressed by shifting the valve timing to the advance side. Moreover, a configuration can be adopted in which the valve timing of the air intake valve 31 is shifted to the delay side when the engine load has become equal to or less than a specified load. When this type of configuration is adopted, during low loads when misfiring readily occurs, at least the occurrence of misfiring can be suppressed by shifting the valve timing to the delay side. These configurations may also be combined, and it is possible to adopt a configuration in which the target phase θtrg is changed in a stepwise manner by shifting the valve timing to the advance side when the engine load is greater than or equal to a specified load and also by shifting the valve timing to the delay side when the engine load is less than a specified load.

In the above description of the embodiment, a configuration has been described in which abnormality estimation means estimates whether the discrepancy between the actual position of the control shaft 340 and the position of the control shaft 340 understood by the electronic control unit 60 is large when it is determined that an instantaneous interruption has occurred. However, the configuration for estimation of whether the discrepancy is large using the abnormality estimation means can be changed as appropriate. Essentially, whatever the method of such estimation is, if a configuration is adopted in which coordinated control is forbidden and the valve timing change mechanism 200 is operated based on the engine load when the discrepancy is estimated to be large, suppression of the occurrence of misfiring and knocking is possible.

In addition, in the above embodiment, a configuration has been described in which the maximum position learning is executed when the discrepancy between the actual position of the control shaft 340 and the position of the control shaft 340 understood by the electronic control unit 60 is estimated to be large. However, even when the internal combustion engine does not execute such learning, by adoption of a configuration of the present invention in which coordinated control is forbidden and the valve timing change mechanism 200 is operated based on the engine load when the discrepancy is estimated to be large, at least suppression of the occurrence of misfiring and knocking is possible. Also with another aspect, that is, an internal combustion engine that executes learning in which the control shaft 340 is operated toward the Lo limit side where the lift amount of the valve 31 becomes smallest and the position at which the control shaft 340 is stopped is learned as the Lo limit, suppression of the occurrence of misfiring and knocking is possible by adoption of a configuration in which coordinated control is forbidden and the valve timing change mechanism 200 is operated based on the engine load.

The lift amount change mechanism 300 explained in the above description of the embodiment is one example of a lift amount change mechanism, and the invention can be applied also in the case of another configuration, as long as the control apparatus of an internal combustion engine is provided with a lift amount change mechanism for changing the lift amount of the air intake valve 31 by causing displacement of the movable part and executes coordinated control by operating the valve timing change mechanism based on the control state of the lift amount change mechanism.

Also, the scheme in which two position sensors S1 and S2 are provided as the position sensor 77, and the accumulated movement of the control shaft 340 is calculated as the stroke count value S based on pulse signals output from each of the position sensors S1 and S2 to estimate the control state of the lift amount change mechanism is one example of position detection means that detects a position of the control shaft 340 based on an amount of relative displacement from a base position, and therefore, the scheme may be changed as appropriate.

The invention claimed is:

1. A control apparatus for an internal combustion engine that includes:
 a valve timing change mechanism that changes a valve timing of an air intake valve;
 a lift amount change mechanism that changes a maximum lift value and a lift time of the air intake valve through displacement of a movable part;
 a position detection device that sets a base position based on a movable limit position where the maximum lift value and the lift time become largest, and detects a position of the movable part based on accumulated movement of the movable part from the base position; and
 a control device that performs coordinated control in which a target position of the movable part is set based on a requested intake air amount, the movable part is moved such that the detected position of the movable part becomes the target position to operate the lift amount change mechanism, and operates the valve timing change mechanism according to a control state of the lift amount change mechanism, the control apparatus comprising:
 an abnormality estimation device that estimates whether an instantaneous interruption of the electrical power supply to the position detection means occurs,
 wherein, when the abnormality estimation device estimates the instantaneous interruption of the electrical power supply to the position detection means occurs, the control device forbids the coordinated control and operates the valve timing change mechanism based on engine load.

2. The control apparatus according to claim 1, wherein, when an interruption of electrical power supply to the control device occurs, the discrepancy between the detected position and the actual position of the movable part is estimated.

3. The control apparatus according to claim 1, wherein when the abnormality estimation device estimates that the instantaneous interruption of the electrical power supply to the position detection means occurs, the control apparatus operates the valve timing change mechanism so as to set the valve timing of the air intake valve more to the delay side as the engine load decreases and to set the valve timing of the air intake valve more to the advance side as the engine load increases.

4. The control apparatus according to claim 1, further comprising a learning device that performs a maximum position learning to correct the accumulated movement by, while adjusting intake air amount using a throttle valve of the air intake path, moving the movable part such that the maximum lift value and lift time increase and learning the position of stoppage of the movable part as the movable limit position, wherein the learning device executes the maximum position learning when the abnormality estimation device estimates that the instantaneous interruption of the electrical power supply to the position detection means occurs.

5. The control apparatus according to claim 1, wherein the control device changes the maximum lift value and lift time of the air intake valve by moving the movable part within a specified control range set within a range more narrow than a movable range of the movable part.

6. The control apparatus according to claim 1, wherein, when the abnormality estimation device estimates that the instantaneous interruption of the electrical power supply to the position detection means occurs, the control device raises an idle rotation speed higher than the idle rotation speed during normal operation.

7. The control apparatus according to claim 1, wherein the control device obtains the accumulated movement by accumulating the movement of the movable part after the start time of engine operation.

8. The control apparatus according to claim 1, further comprising a memory for storing the accumulated movement.

9. The control apparatus according to claim 8, wherein the control device resets the accumulated movement stored in the memory to zero when the engine is stopped.

10. The control apparatus according to claim 8, wherein, when the accumulated movement of the memory is reset to zero despite the engine not being stopped, the abnormality estimation device estimates that the discrepancy between the detected position of the movable part and the actual position of the movable part is large.

11. A control method for an internal combustion engine including a valve timing change mechanism for changing a valve timing of an air intake valve and a lift amount change mechanism for changing a maximum lift value and lift time of the air intake valve through displacement of a movable part; the control method comprising:
    detecting a position of the movable part;
    estimating whether an instantaneous interruption of the electrical power supply to a position detection device that detects the position of the movable part occurs;
    when the instantaneous interruption of the electrical power supply to the position detection device occurs, forbidding coordinated control in which the movable part is moved such that the position of the movable part becomes a target position to operate the lift amount change mechanism, and the valve timing change mechanism is operated according to a control state of the lift amount change mechanism; and
    operating the valve timing change mechanism based on engine load during a time period when the coordinated control is forbidden.

12. The control method according to claim 11, wherein, when an interruption of electrical power supply to control device that performs the coordinated control occurs, the discrepancy between the detected position and the actual position of the movable part is estimated.

* * * * *

UNITED STATES PATENT AND TRADEMARK OFFICE
CERTIFICATE OF CORRECTION

PATENT NO. : 8,050,850 B2  
APPLICATION NO. : 12/601695  
DATED : November 1, 2011  
INVENTOR(S) : Naohide Fuwa et al.

Page 1 of 1

It is certified that error appears in the above-identified patent and that said Letters Patent is hereby corrected as shown below:

Column 22, line 51, change "means" to --device--;
line 54, change "means" to --device--;
line 65, change "means" to --device--.
Column 23, line 14, change "means" to --device--;
line 23, change "means" to --device--.

Signed and Sealed this
Fourteenth Day of August, 2012

David J. Kappos
*Director of the United States Patent and Trademark Office*